No. 784,624. PATENTED MAR. 14, 1905.
E. A. MOORE & F. HOLLAND.
MACHINE FOR HEADING BOLTS.
APPLICATION FILED JULY 8, 1901.
10 SHEETS—SHEET 1.
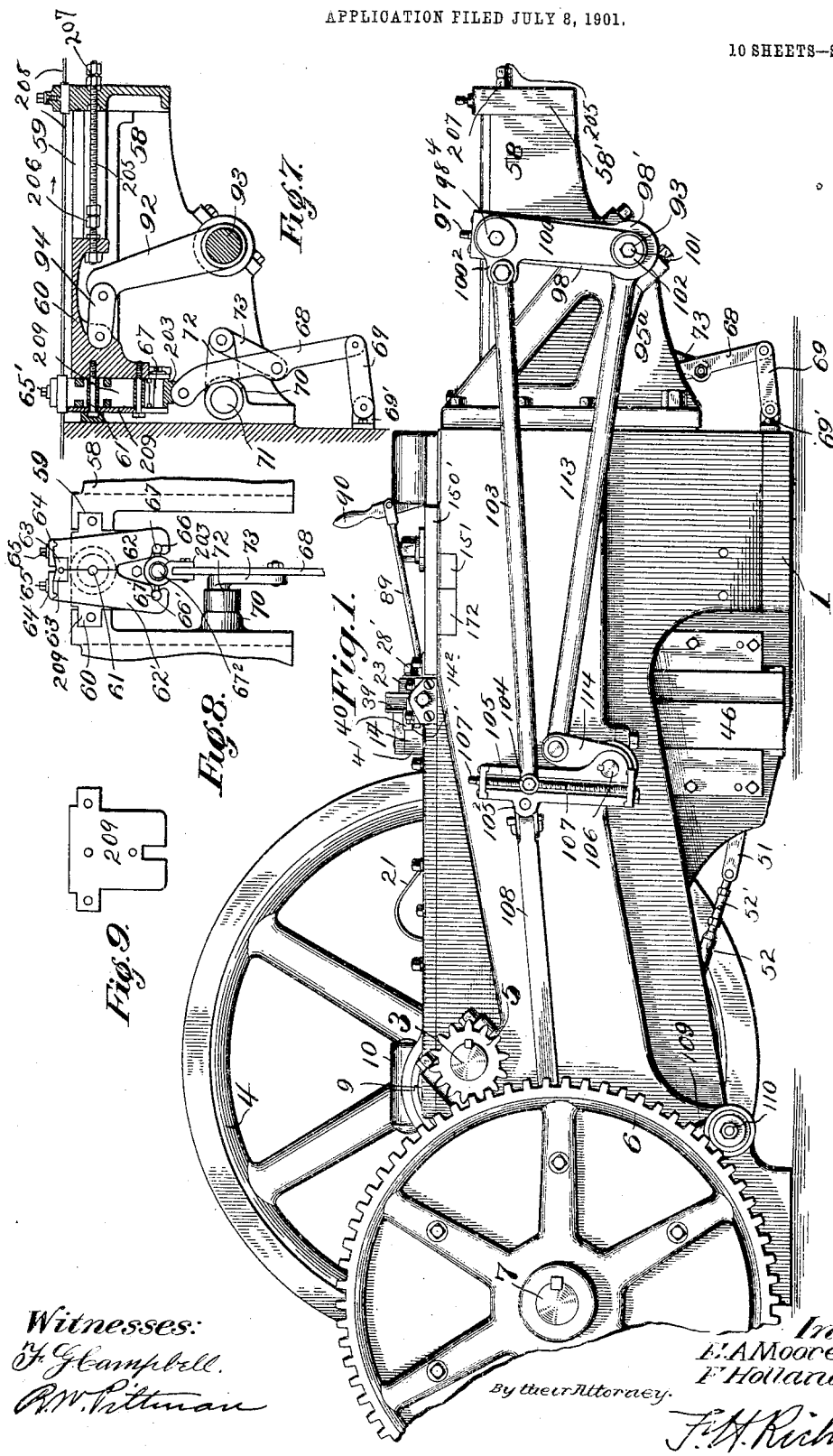
Witnesses:
F. G. Campbell
R. W. Pittman
Inventors,
E. A. Moore and
F. Holland
By their Attorney
F. H. Richards No. 784,624. PATENTED MAR. 14, 1905.
E. A. MOORE & F. HOLLAND.
MACHINE FOR HEADING BOLTS.
APPLICATION FILED JULY 8, 1901.
10 SHEETS—SHEET 2.
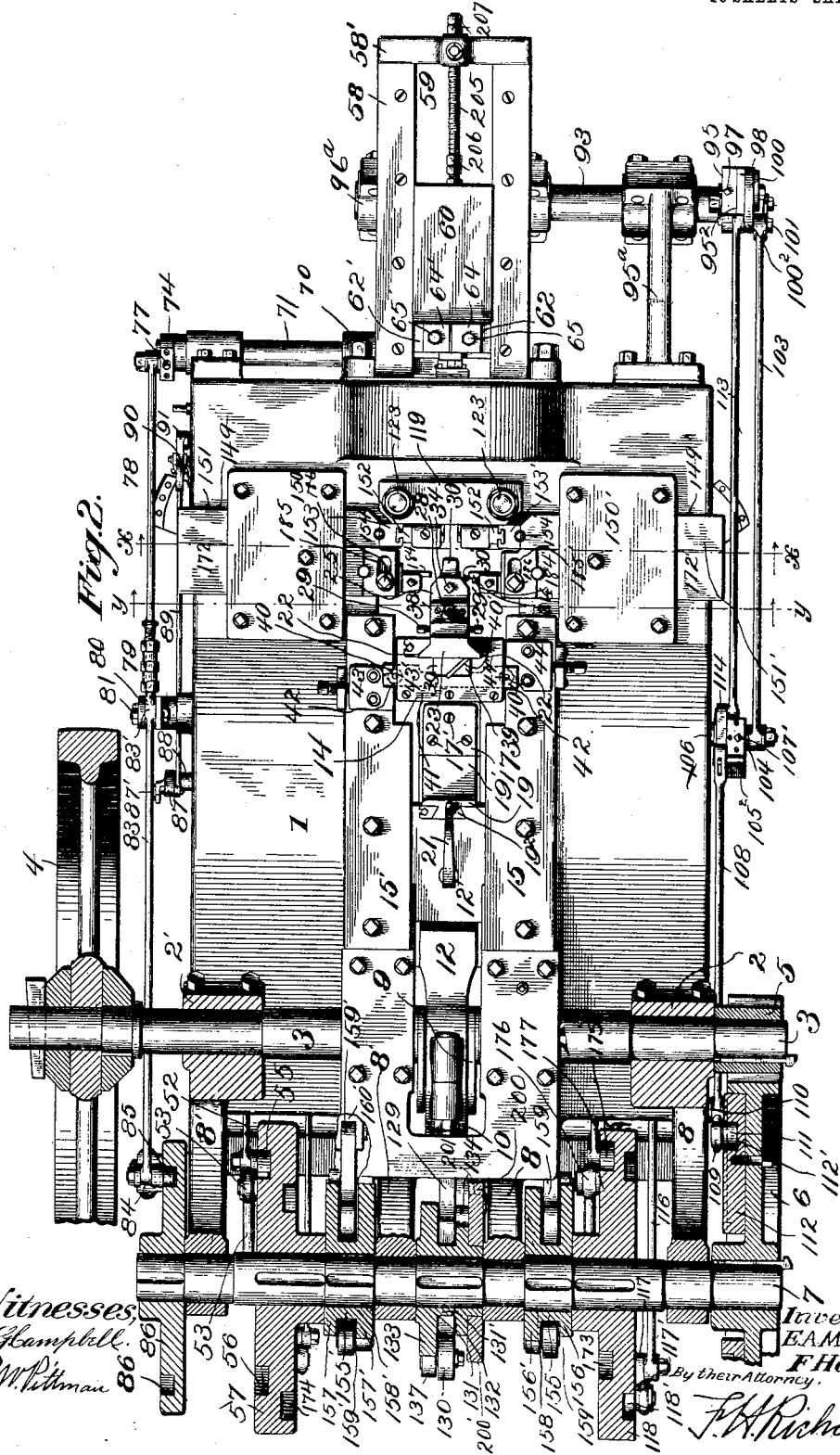

No. 784,624. PATENTED MAR. 14, 1905.
E. A. MOORE & F. HOLLAND.
MACHINE FOR HEADING BOLTS.
APPLICATION FILED JULY 8, 1901.
10 SHEETS—SHEET 3.
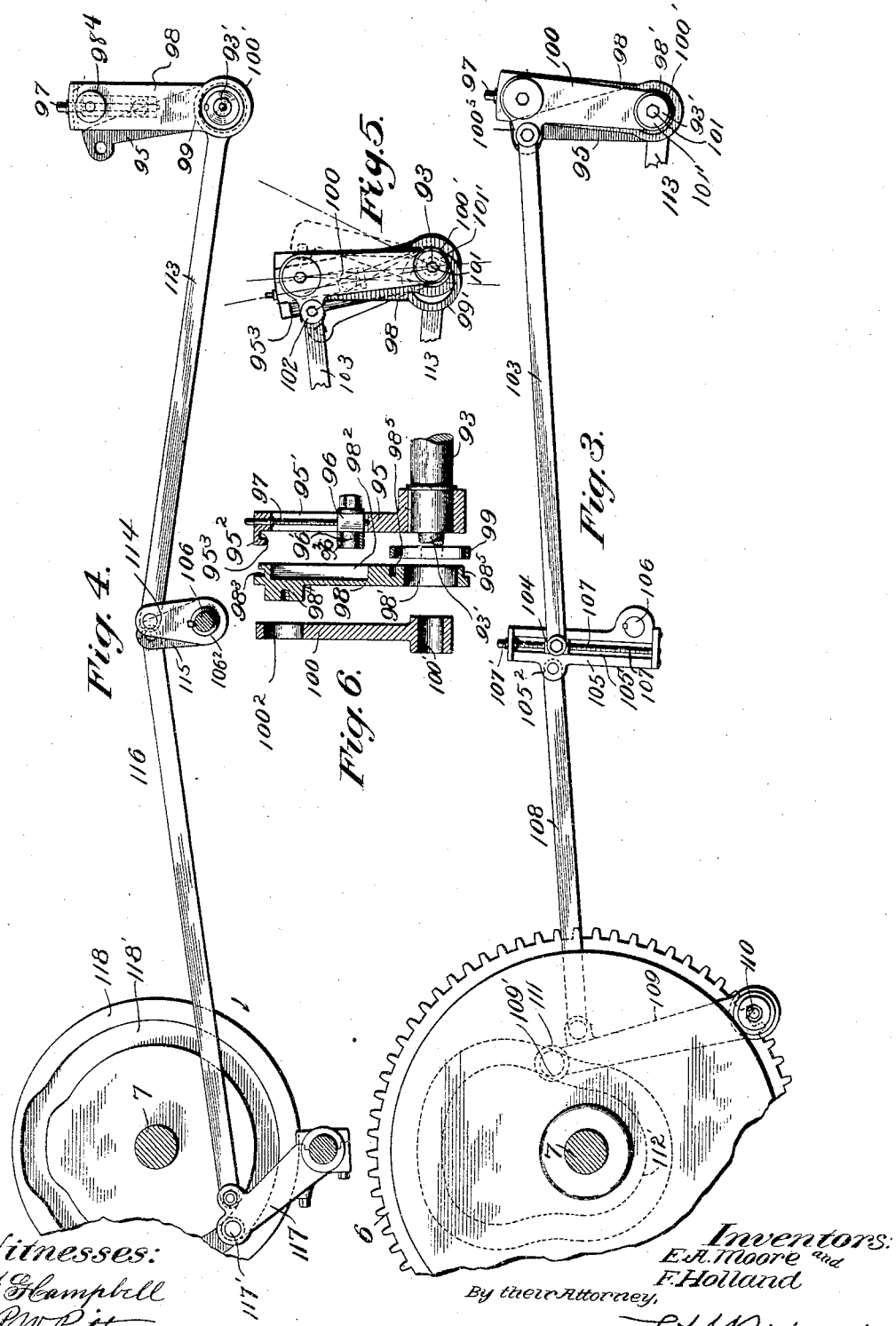
Witnesses:
Inventors:
E. A. Moore and
F. Holland
By their Attorney, No. 784,624. PATENTED MAR. 14, 1905.
E. A. MOORE & F. HOLLAND.
MACHINE FOR HEADING BOLTS.
APPLICATION FILED JULY 8, 1901.

Witnesses:
H. J. Campbell.
R. W. Pittman.

Inventors:
E. A. Moore and
F. Holland
By their Attorney
F. W. Richards

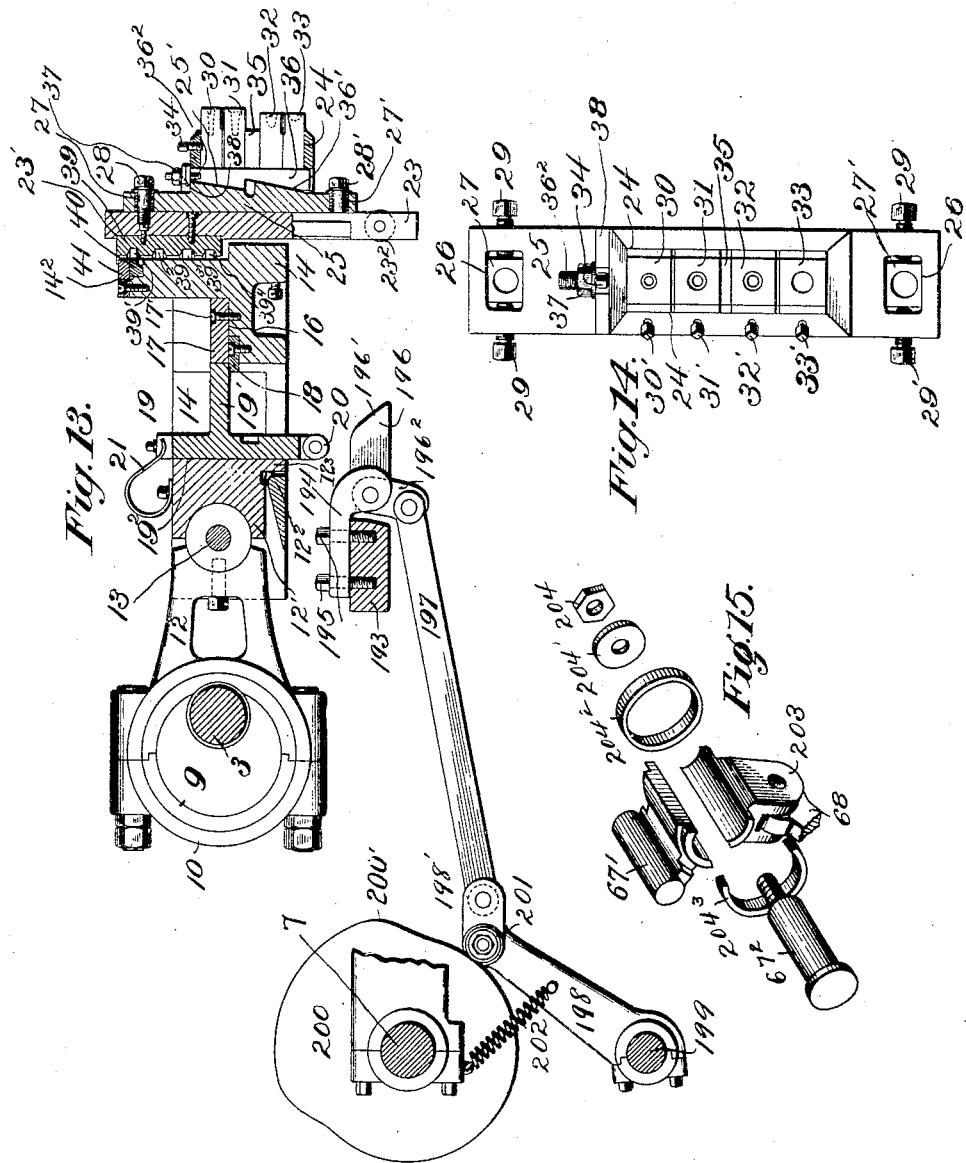

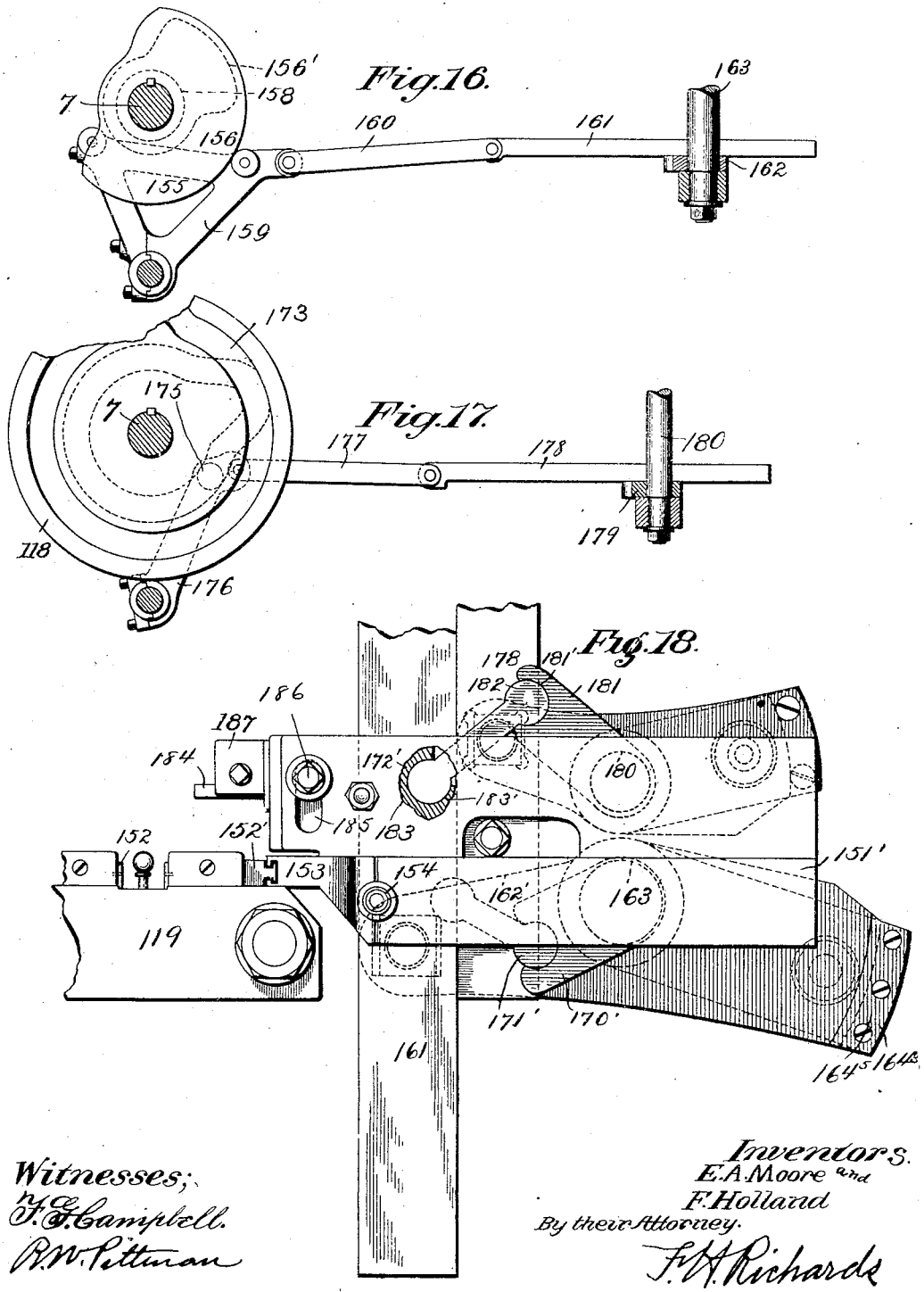

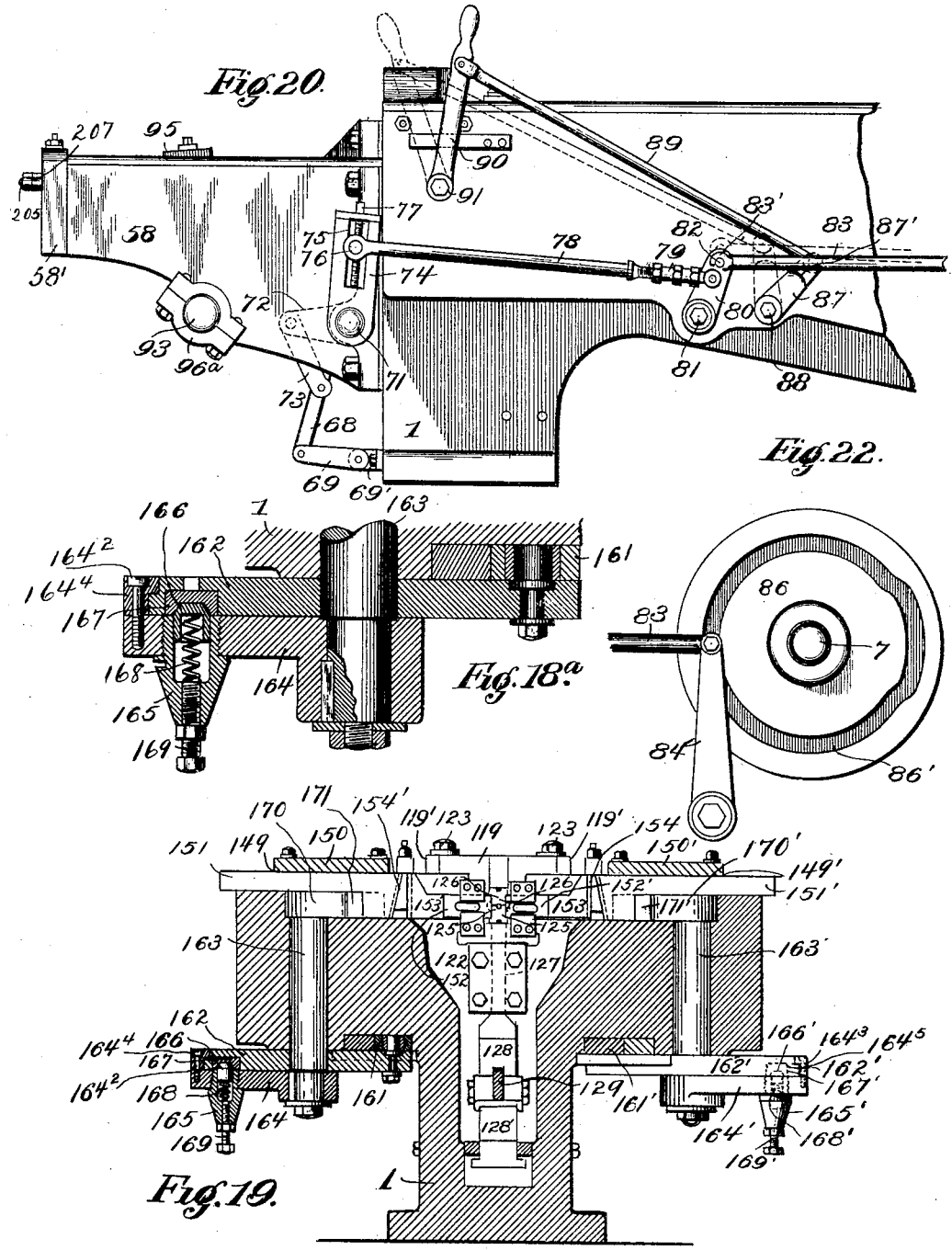

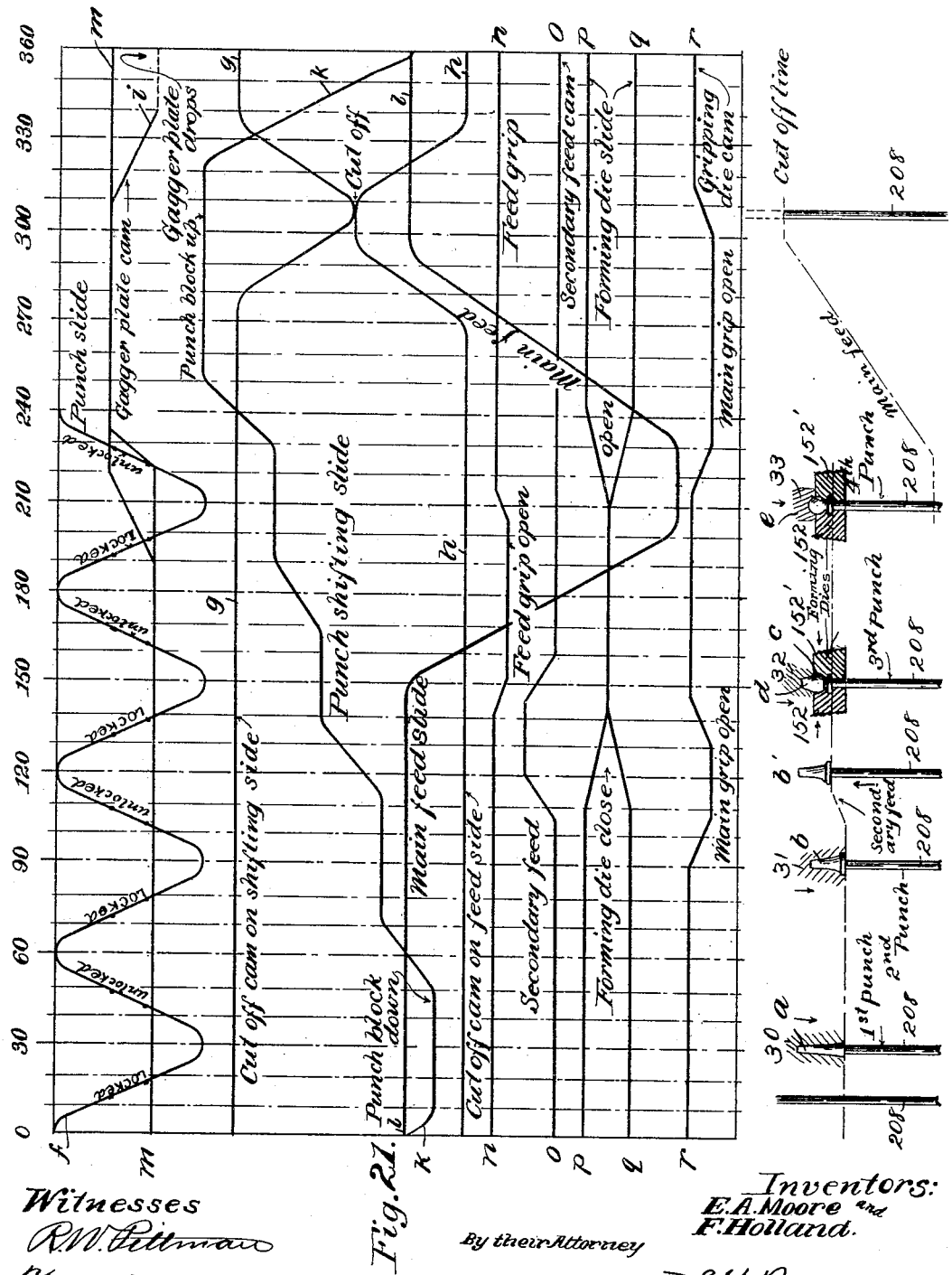

No. 784,624. PATENTED MAR. 14, 1905.
E. A. MOORE & F. HOLLAND.
MACHINE FOR HEADING BOLTS.
APPLICATION FILED JULY 8, 1901.
10 SHEETS—SHEET 9.
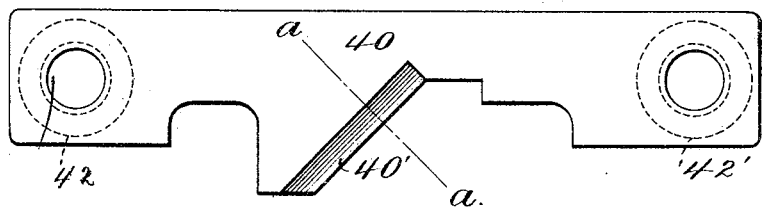
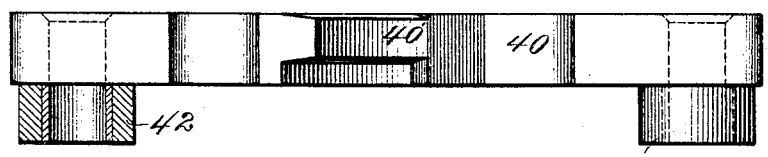
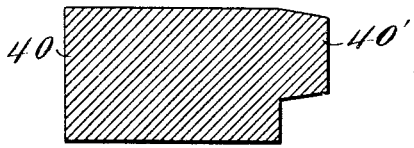
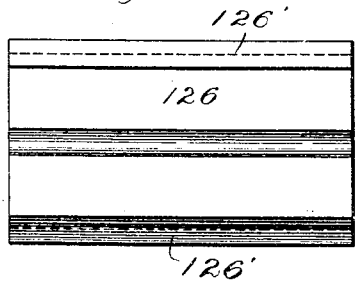
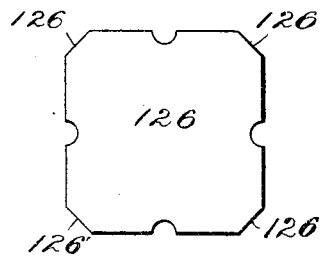
Witnesses:—
F. C. Fladner.
F. G. Campbell
Inventors:
E. A. Moore and
F. Holland.
By their Attorney
F. W. Richards.

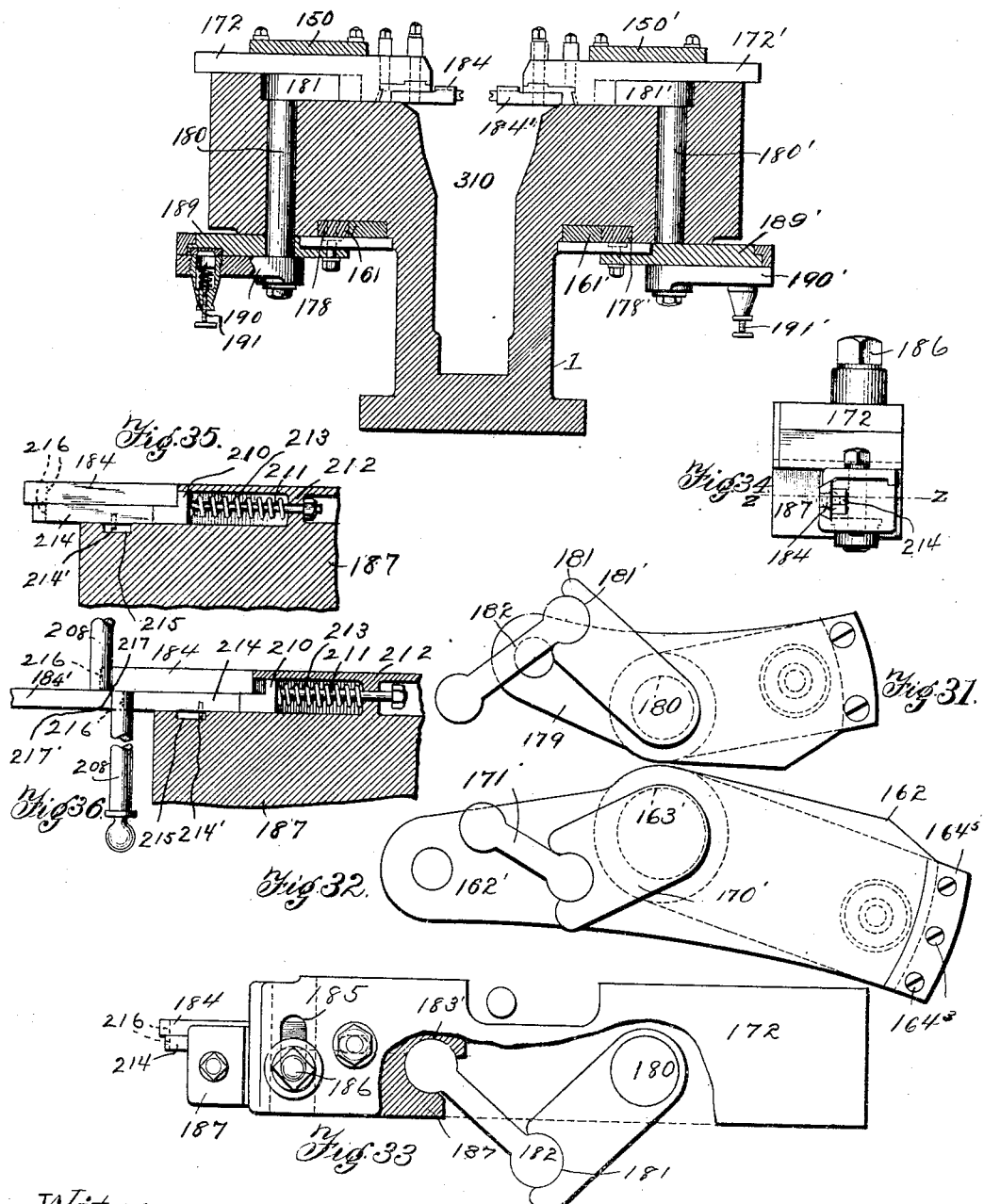

No. 784,624.

Patented March 14, 1905.

UNITED STATES PATENT OFFICE.

ETHELBERT ALLEN MOORE, OF NEW BRITAIN, CONNECTICUT, AND FRANKLIN HOLLAND, OF BALTIMORE, MARYLAND, ASSIGNORS TO THE STANLEY WORKS, OF NEW BRITAIN, CONNECTICUT, A CORPORATION OF CONNECTICUT.

MACHINE FOR HEADING BOLTS.

SPECIFICATION forming part of Letters Patent No. 784,624, dated March 14, 1905.

Application filed July 8, 1901. Serial No. 67,495.

*To all whom it may concern:*

Be it known that we, ETHELBERT ALLEN MOORE, residing at New Britain, in the county of Hartford and State of Connecticut, and FRANKLIN HOLLAND, residing at Baltimore, in the State of Maryland, citizens of the United States, have invented certain new and useful Improvements in Machines for Heading Bolts, of which the following is a specification.

Our invention relates to machines for forming heads on the ends of metallic material, and more particularly to that class of said machines employed for manufacturing what are known as "hinge-pins"—*i. e.*, pins employed in uniting the sections of butt and other hinges.

Primarily the object of our invention is the provision of a machine for accomplishing the purpose stated which is so organized and constructed that the head will be formed by a plurality of blows given by dies carried by a header-slide and in this connection the provision of side-forming dies which will be closed by suitable mechanism upon the material just after the second operation has been carried out thereon by the dies of said header-slide.

A further object of the invention is the provision of improved feeding mechanism for advancing the material through the machine.

Further objects of the invention are the provision of improved mechanism for actuating the various parts of the machine in proper sequential order, improved mechanism for cutting off the completed product from the stock, improved mechanism for automatically controlling the reciprocatory movements of the header-slide, and improved mechanism for connecting and disconnecting certain parts of the machine when desired.

Other objects of the invention will be disclosed in the general description, which now follows:

Referring to the drawings, Figure 1 is a right-hand side elevation of the machine. Fig. 2 is a plan view of the machine with the cams thereof and certain other parts represented in section. Fig. 3 is a side elevation, with parts broken away, of the connections from the cam-shaft to the rock-shaft which operates the wire or rod grip or feed-slide during what is known as the "main" feed. Fig. 4 is a view corresponding to Fig. 3 of the connections from the cam-shaft to the rock-shaft and feed-slide for actuating what is known as the "secondary" feed. Fig. 5 is a detail view showing by full and dotted lines the connections for operating the main and secondary feeds. Fig. 6 represents in detail the parts of the main and secondary feed connections and shows the manner in which said parts are assembled. Fig. 7, Sheet 1, is a longitudinal section of the feed-slide and wire or rod grip, some of the operating parts being represented in elevation. Fig. 8 is an end view of the mechanism shown in Fig. 7 looking in the direction of the arrow, the front plate for holding the gripping or clamping jaws of the feed mechanism in place being removed. Fig. 9 is a front elevation of the front plate shown in section in Fig. 7. Fig. 10 is a detail view, partially in section, of the gripping-dies and toggle connections therefrom to the main cam-shaft, said figure also illustrating a means employed for adjusting the toggles. Fig. 11 is a detail view of the head for holding the dies which grasp the wire or rod during the action of the heading-tools, a portion of said view being in section to illustrate a means employed for separating said dies. Fig. 12 is a side view of the vertical slide for raising the device carrying the heading dies or punches, illustrating the rack-and-pinion mechanism employed for elevating said device and the cam-shaft, cam, and connections for actuating said mechanism. Fig. 13 is a transverse vertical section of the main cam-shaft, illustrating in elevation and section the devices intermediate said shaft and the header-slide and the shaft and eccentric for causing successive blows to be delivered by the heading dies or punches carried by said slide. Fig. 14 is a front elevation of the frame carrying the heading dies or punches, said frame being removed from the slide. Fig. 15 represents detail views in perspective of the part of the toggle-joint for actuating the wire or rod gripping jaws. Fig. 16 is a detail view, partially in section, of the cam and its connections to the forming-die mechanism, one only of said connections and cams being illustrated. Fig. 17 is a similar view of the left-hand cam and connections therefrom to one of the cut-off slides, the right-hand cam and connections and the right-hand cut-off slide being similar thereto, except as hereinafter stated. Fig. 18 is an enlarged plan view showing one of the cut-off and one of the forming dies and the toggle mechanism for actuating said dies. Fig. $18^a$ is a cross-section through the rocker and its detent, the latter serving to prevent accident in case the dies should become clogged. Fig. 19 is a cross-section of the machine on line $x\ x$, Fig. 2, looking toward the right and illustrating the gripping and forming die mechanism. Fig. 20 is a side elevation of part of one side of the machine, showing the hand-lever and connections for permitting the opening of the feed-gripping jaws. Fig. 21 is a diagrammatic view showing a cam-chart and views of the product as it is completed in sequential order, also illustrating how the various cams operate in proper timing. Fig. 22 is a side view of the cam for actuating the feed-gripping jaws. Fig. 23 is a plan view of a slide employed for locking the heading-tools in position at each operating stroke of the header-slide. Fig. 24 is a side view of said slide. Fig. 25 is a section on line $a\ a$ of Fig. 23. Fig. 26 is a plan view of the locking-plate with which the slide illustrated in Fig. 23 coöperates. Fig. 27 is a side view of said locking-plate. Fig. 28 is a side elevation of one of the main gripping-dies of the machine. Fig. 29 is an end view of one of said main gripping-dies. Fig. 30 is a cross-section of the machine on line $y\ y$ of Fig. 2 looking in the direction of the arrow. Fig. 31 is a detached view of part of the mechanism for operating one of the cut-off slides, and Fig. 32 is a view similar to Fig. 31 of part of the mechanism for actuating the forming-die slides. Figs. 33, 34, 35, and 36 are detail views of one of the cut-off-tool slides, showing how the tools are supported therein.

Like numerals designate similar parts throughout the several views.

Referring to the drawings, the numeral 1 indicates a frame, which may be of any desired kind suitable to support the operative parts of the machine and in bearings 2 2' of which is supported the crank or eccentric shaft 3, carrying at one extremity a large belt-pulley 4 and at its opposite end a pinion 5 in mesh with a large gear 6, secured to the cam-shaft 7, the latter being journaled in brackets 8 8', projecting from the rear part of said frame, as shown in Fig. 2.

Secured to the shaft 3 is an eccentric 9 and surrounding said eccentric is a strap 10, from which projects a pitman 12, articulated at 13 to a block 12', movable in a header-slide 14, reciprocable in ways 15 15' of the frame. An abutment $12^2$ is placed on the header-slide and a shoulder $12^3$ on said block for returning the slide after its excursion by the gagger-plate, to be presently described. This slide 14 is chambered at 14' and is provided with a ledge or shoulder 16, upon which a wear-plate or abutment 17 is detachably secured by screws 17', as indicated in Fig. 13, and also secured to this shoulder is a plate 18, which projects within the chamber 14' and serves to sustain the arm 19' of a T-shaped plate 19, known in the art as a "gagger-plate," the T-shaped head of said plate being fitted, as by a dovetail $19^2$ or otherwise, in a guideway of the block 12', and the lower end of said head being provided with a roller or other antifriction-surface 20 for purposes hereinafter explained. Secured to the block 12' is a spring 21, preferably of bowed form, although this is immaterial, which bears against the top of the T-shaped head $19^2$ of the gagger-plate, and normally tends to force said plate to the position represented in Fig. 13, with its horizontal arm resting upon the plate 18 and its end in contact with the wear-plate or abutment 17.

As will be seen by reference to Figs. 2 and 13, the forward end of the header-slide is provided with a guideway 22 for the reception of a vertically-reciprocating slide 23, to which the heading-dies are secured. These heading-dies are, as shown in Figs. 13 and 14, four in number, and they are secured in a guideway 24, projecting horizontally from a plate 25, provided with slots 26 26' adjacent to its upper and lower ends. In these slots are fitted sleeves 27 27', respectively, having flattened sides, and through the sleeves bolts 28 28', respectively, are passed, the threaded ends of said bolts entering the slide 23. Screws 29 29', respectively, bear against the ends of the sleeves and serve as a means for adjusting the plate 25 laterally upon the header-slide 23 properly to position the plate carrying the heading-dies, said dies being marked 30, 31, 32, and 33, respectively, upon the vertically-reciprocatory slide 23, said heading-dies being secured in their seat or guideway 24, with capability of adjustment therein by screws 30', 31', 32', and 33' and by an end bearing-screw 34, as illustrated in Fig. 14. These heading-dies are spaced apart in pairs by a filling piece or strip 35, and they may be horizontally adjusted in guideway 24 by a wedge 36, provided with an inclined step-like back 36', which bears against a similarly-formed surface 25' on the plate 25, a nut 37, engaging a threaded stem $36^2$ of the wedge and bearing against a plate 38, being employed for adjusting said wedge 36 to accomplish the object stated.

On its rear portion the slide 23 is recessed at 23' to receive a locking-block 39, having notches 39', 39², 39³, and 39⁴, respectively. Corresponding in number to the heading-tools employed and coöperating with this locking-block is a locking plate or bar 40, having an inclined pawl or dog 40', said locking-plate being fitted for horizontal movement in a seat 14² of the header-slide 14. This locking-plate 40 is held in place by a cap 41 and is provided, as stated, with an inclined surface or pawl 40', which when the sliding plate 40 is reciprocated in one direction is caused to enter the one of the inclined seats of the block 39 which is opposite thereto and to lock slide 23 and the heading-tools carried thereby firmly in position during the stroke of the header-slide 14.

At each end the sliding locking-plate is equipped with antifriction-rollers 42 42', respectively, which as the header-slide reciprocates bear against hardened-steel plates 43 44, secured to the frame, said plates having inclined surfaces 43' 44', against which the rollers bear as the header-slide moves back and forth.

From what has been stated it will be obvious that as the header-slide 14 moves forward the roller 42 of the locking-slide will bear against the incline 44' of plate 44, and that said slide will thus be forced laterally to cause the dog 40' thereof, which is of wedge shape, to enter the inclined seat of the locking-block 39 which is then in line therewith, and that when the header-slide is retracted the roller 42' will bear against the inclined surface 43' of plate 43 and will force the locking plate or slide in the opposite direction to withdraw the inclined dog or pawl 40' from its seat, and thereby release the slide 23.

For raising and lowering at proper times the slide 23, carrying the heading-tools, in the sequential order of operation of the machine any suitable mechanism may be employed; but we find advantageous for this purpose rack-and-pinion mechanism, (designated in a general way by 45 and illustrated in detail in Fig. 12.) At its lower end the slide 23 is preferably provided with an antifriction-roller 23², which rests upon the upper edge of a slide 46, fitted for vertical movement in a guideway of the frame 1, and to this slide is secured a rack 47, with which engages a pinion 48, secured to a shaft 49, said shaft also carrying a pinion 50 in engagement with a rack 51, articulated at one end to a pitman 52, connected to a lever 53, secured to a rock-shaft 54, said pitman having an adjustable section or turnbuckle 52'. This lever 53 carries adjacent to its upper end an antifriction-roller 55, which is fitted in a groove 56 of a cam 57, secured to the cam-shaft 7, the groove of said cam being so shaped that it will impart through the mechanism described one upward movement to the slide 23, carrying the heading-tools, and four downward movements to said slide at the proper intervals. Stated differently, the cam-groove 56 is formed with four active portions 56', 56², 56³, and 56⁴, respectively, each of which will in turn act upon the roller 55 of lever 53, thereby causing said lever to advance the rack 51 four times during each revolution of the cam, said rack moving but a short distance during each excursion and serving through the gearing 48 50 and rack 47 intermittingly to raise the slide 23 and to bring each of the heading-dies 30, 31, 32, and 33, respectively, into position to accomplish its work. Between each of the surfaces of the cam-groove just described the same is formed with concentric portions which have no effect upon the roller 55 and serve to lock the parts after each operation of an active portion and while the heading-dies are respectively performing their work.

A portion 56⁵ of the cam-groove serves to restore the mechanism just described to its normal position after the heading-tools have consecutively performed their work.

For feeding the rod or wire (preferably in a cold state) at proper intervals to the positions where the end thereof will be acted upon by the various dies and cut-off tools of the machine improved mechanism has been devised, which will now be described. In the peculiar operation of our machine the stock rod or wire is first advanced through the gripping-dies by what is known as "main feed mechanism." The gripping-dies are then closed, and the end of the rod or wire is subjected to the action of the heading-dies 30 and 31, as will be more clearly hereinafter explained, and this main feed mechanism will now be described.

Projecting from the forward end of frame 1 of the machine and preferably bolted thereto, as shown in Figs. 1 and 2, is a bracket or extension 58, having a guideway 59, in which is fitted a feed-slide 60, and pivotally mounted on a bolt 61, secured in the forward end of said slide, are levers 62 62', carrying feed gripping or clamping jaws 63 63', which are held in place in seats of said levers by caps 64 64', secured by bolts 65 65', as shown in Figs. 2, 7, and 8. At their lower ends the levers 62 62' are provided with seats 66 66', respectively, for the reception of the globular ends of toggles 67 67', and to a member of these toggles a lever 68 is articulated, as illustrated in Figs. 7 and 8, said lever being connected at its lower end to a link 69, pivoted to a bracket 69' of the frame. Journaled in a bearing 70, projecting from the frame, is a rock-shaft 71, and secured to the inner end of said rock-shaft is a crank-arm 72, connected by a link 73 to lever 68. Secured to the outer end of rock-shaft 71 is an arm or crank 74, slotted at 75 to receive a block 76, which may be adjusted in slot 75 by a screw 77, as shown in Fig. 20, and pivoted to a wrist-pin on said block 76 is a pitman 78, having an adjustable section 79 for varying its length, said section being pivoted to an arm 80, mounted for swinging movement upon a stud 81, projecting from the side of the frame. Upon the upper portion of arm 80 is a pin 82, with which the hook-shaped end 83' of a pitman 83 engages, the rear end of said pitman being articulated to a lever 84, pivoted to the frame and carrying an antifriction-roller 85, received in a cam-groove 86' of a disk 86, secured to the end of cam-shaft 7. For releasing at will the pitman 83 from pin 82 of arm 80, and thereby enabling the feed-gripping jaws to be operated by hand when necessary or to disconnect the feed if desired, we provide lever-and-link mechanism consisting of an arm 87, pivoted to a stud 88 on the frame, said arm having a cam-surface 87' in engagement with the pitman 83, and articulated to this arm and pivot is a rod 89, connected to a lever 90, pivoted at 91 to the side of said frame, as shown in Fig. 20. As will be obvious, by grasping this lever 90 and swinging the same to the position shown in dotted lines in said figure the pitman 83 will be disconnected in the manner described, thereby breaking the connections to the cam 86, rendering the toggle-actuated gripping-dies ineffective, and thus stopping the feed. This is important should it be desired to open the feed-gripping dies by hand or for any reason to stop the feed action of the machine.

To accomplish one of the objects of this invention, the stock must be given not only its feed, but after some of the heading-dies have acted upon it it must be given a secondary feed in the direction of the former feed and the partially-formed head halted at a predetermined position with a degree of precision. Such sequential feed is had by imparting to the reciprocating feed-slide 60 an excursion, but by two steps in the present instance, of unequal length, and when the parts to produce the second step become operative there must be no faltering or retrogression of the blank, but a positive advance of predetermined length. The two steps of the excursion in one direction and the return of the slide 60 are imparted by a lever 92, secured to a rock-shaft 93, connected by a link 94 to said slide and journaled in a bearing of a bracket $95^a$, projecting from the frame adjacent to its right-hand end and in a bearing $96^a$ of the extension 58 at its left-hand end. The rock-shaft has fast upon it adjacent to one extremity an arm 95, (see Figs. 3 to 6, inclusive,) slotted at 95' to receive a block 96, carrying a wrist-pin 96', which may carry an antifriction-roll $96^2$, said block being adjustable in the slot 95' by means of a screw 97, whereby the movement of the rock-shaft and the stroke of the feed-slide may be regulated as desired. The arm 95 is provided with an overhanging lip or projection $95^2$, grooved on the arc of a circle, as at $95^3$, for a purpose hereinafter stated. A second arm 98, provided with an eye 98', surrounding the shaft 93, is located adjacent to the arm 95 and has a longitudinal groove $98^2$ to receive the roll $96^2$ and a groove $98^3$ in its top for the reception of the lip $95^2$ of the arm 95 and a laterally-projecting circular stud $98^4$, having a working fit with an eye $100^2$ in the free end of an arm 100, which latter arm also carries a hub 100', having a working fit with a reduced portion 93' of the shaft 93. The arm 98 has a hub $98^5$ surrounding the eye 98' and partly formed by a circumferential groove and partly by a rabbet. Said hub has a working fit with an eye 99 on a pitman 113. The arm 100 may be held loosely in place on the shaft 93 by a screw 101 and washer 102. To an ear $100^3$ of the arm 100 is pivoted one end of a pitman 103, and the other end of said pitman is articulated to a block 104, mounted in a slot 105' of a rocker 105 upon a rock-shaft 106, journaled in bearings of the frame. A screw 107, having a head 107', to which a wrench may be applied, is threaded through the block 104 and serves as a means for adjusting the same to thereby vary the stroke of the arm 100. Pivoted at one end to an ear $105^2$ of the rocker 105 is a link or connector 108, and the opposite extremity of this link is articulated to a lever 109, pivoted at 110 to the frame. This lever 109 has a stud 109', upon which may be fitted an antifriction-roll 111, as shown in Figs. 2 and 3. Fitted upon and secured to the cam-shaft 7 adjacent to and just outside of the bracket 8 is the gear-wheel 6, before described, and secured to the inner side of the web of said gear-wheel is a disk 112, having a cam-groove 112', and this cam-grooved disk constitutes what is known as the "main feed-cam," as will be hereinafter described.

Fitted upon the eye or hub 98' of arm 98 is the part 99 of a pitman 113, articulated at its opposite end to a lever 114, fast on a sleeve $106^2$, loose upon the rock-shaft 106, which is journaled in bearings of the frame, and on this sleeve within the frame is also fast another arm 115, to the upper end of which is pivoted a pitman or connecting-rod 116, articulated at its opposite extremity to a lever 117, having a stud 117', which enters a cam-groove 118' in the side of a disk 118, secured to shaft 7, said cam constituting what is known as the "secondary feed-cam."

In briefly describing the operation of the parts just alluded to they will be followed from the source of power to the operating-point. The source of power in the present instance may be assumed to be the shaft 7, upon which the disk 112, having the cam-groove 112', is fast and upon which is also fast the disk 118, having the cam-groove 118'. These are seen at the left-hand end of Fig. 2 in horizontal section. The respective cams are plotted in Figs. 3 and 4. The groove 112' is the actuator for the primary or main feed and the groove 118' is the actuator for the secondary or auxiliary feed, and it will be seen that the neutral portion of the active face of the cam in the groove 112' embraces a wider angle than the entire active portion of the cam in the groove 118', so that the parts actuated by the cam 118' are moved and returned to the position from which such cam moved them, while the parts controlled by the cam 112' are held in the extreme position to which they are moved by such cam. Cam 112' acts upon the arm 109, pivoted at 110, through an antifriction-roll 111. The arm 109 is connected by a link 108 to the rocker 105, which rocker is connected by a link with the arm 100, which arm, as was above stated, is loose on the shaft 93. The connection between the link 103 and the rocker 105 is adjustable to vary the throw given such arm by the cam 112'. The throw of such cam is imparted from the arm 100 to the shaft 93 by means of the hub $98^4$, carried by the arm 98 to the wrist-pin 91, adjustably carried by the arm 95, which is fast upon the shaft 93. During the main feed movement the lower end of the arm 98 is held in a locked position by means of the pitman 113 and its eye 99, which is received by the hub $98^5$ at the shaft end of such arm, and while so held the shaft end of the arm is its fulcrum end. The power is applied at the other end of the hub $98^4$, and the work is accomplished in the slot $98^2$ at whatever portion thereof the wrist-pin 96' has been shifted by the adjusting-screw 97. The rock-shaft 93 by its rocking will move the arm 92 and the feed-slide 60 to impart one step of the forward excursion of the feed-slide and with it the gripping-jaws 63 63', which hold the stock. After the main feed movement the roll 111 will be held in the concentric portion of the cam-groove farthest from its axis, which will lock the free end of the arm 98 or the end carrying the hub $98^4$, so that in the secondary feed movement the end farthest from the shaft 93 of such arm 98 will be the fulcrum. The work will be done as in the former instance and will be applied at the hub $98^5$. As was before stated, the secondary feed-cam only commences to become active when the roll 111 is traversing the concentric portion of the cam-groove 112' farthest from the axis of the cam-shaft. The secondary cam 118' operates an arm 117 through pin 117'. The rocking of the arm 117 throws the lower or shaft end of the arm 98 by means of the pitman 116, pivoted to the rock-arm 115, fast upon the sleeve $106^3$, which surrounds the shaft 106, to which sleeve is also fast arm 114, pivoted to the link 113, which, as before stated, carries the eye 99, which forms the point for the application of power to the arm 98, and when the active portion of the cam 118' becomes effective this arm, which is in the nature of a lever, will be rocked upon the fulcrum $98^4$ and will rock the shaft 93 an additional distance in the same direction in which it was rocked by the cam 112'. After the secondary feed the parts will be returned to the position they occupied before such action, when they will be returned to the normal position by the main feed-cam. Thus it will be seen that the arm 98 is in the nature of a lever and that it forms a connection between the arms 100 and 95. The arm 95 may be regarded as a crank-arm upon the rock-shaft and the wrist-pin 96' as a point whereby such crank-arm may be engaged to actuate the rock-shaft; the arm 98, as a lever connected midward of its ends to such point, and either end of such lever 98 as capable of being made the fulcrum and the other end the point for the application of power; the cam 112', as a means to apply power through the connected parts of one end of said lever when the other end is held by the cam 118' and its connections, and the other end of said lever will become the active end when the former active end is held by the cam 112' and its connections and is operated by the cam 118' and its connections. As such cams are fast upon the cam-shaft, which when the machine is in operation will be continuously rotated, the respective ends of said lever will alternately be made the fulcrum, and it will be alternately turned on its respective fulcrums. Thus it will be seen that the stock is fed forward, is held from any retrogression, and is again moved forward upon the same line, the main feed not releasing its action when it brings the stock to the limit of its throw, but holding the same during the secondary feed movement.

Designated by 119 is a block or die-holder containing the gripping-dies 125 126, respectively, which act to clamp the wire or rod during several of the upsetting or head-forming operations, and this block is inserted in a chamber or recess 122 of the frame 1 and is provided with perforated flanges 119', through which bolts 123 pass for securing said die-block in position. Fitted in a groove or way 123' of the die-block, said way being lined with hardened wear-plates 124, are the aforesaid gripping-dies 125 126, respectively, which have inclined corners 125' 126' and are provided each with four semicircular grooves, one in each of the sides of the die, whereby the dies may be reversed in a well-known manner. Upper die 126 bears against an abutment $119^2$ of die-block 119, whereas the lower die 125 is capable of vertical movement in the guideway 123'. (See Figs. 11 and 19.)

Designated by 127 is a slide or plunger against which the lower die 125 rests, and for reciprocating this plunger toggle-links 128 128' are employed, as illustrated in Fig. 10, said toggle-links being actuated at the proper times by a pitman 129, connected to a triangularly-shaped lever 130, (for which a yoke or other device may be substituted, if desired,) the pitman being in turn operated by a double cam 131, known as the "main gripping-cam." This cam is, as shown in Figs. 2 and 10, composed of two cam-disks 132 133, respectively, shown as preferably integral with a hub 131', splined to the cam-shaft 7. An anti-friction-roll 134, carried by lever 130, bears against the periphery of cam-disk 132, and this roll is carried by an arm 135, adjustable by screw 136 on one side of the lever to take up wear. A similar roll, 137, is located on the opposite side of lever 130 and bears against the cam-shaped periphery of disk 133.

As will be seen by reference to Fig. 10, the cam-disk 132 is shaped to impart two forward impulses to pitman 129, thereby so actuating the toggles 128 128' that they will withdraw the die-operating plunger 127 twice during every revolution of shaft 7, after which the cam-disk 133 will operate upon said lever, thereby also causing the pitman 129 to bring the toggles twice to a vertical line, (see Fig. 10,) and thus closing the die 125 upon the stock rod or wire twice during each rotation of said cam-shaft 7. To adjust the toggles to vary the gripping force of the die 125 or to provide for other contingencies, such as the substitution of dies having gripping-cavities of varying sizes to enable the machine to operate upon different diameters of wire or rod, the substantially globular end of toggle member 128' is seated in a socket of a block 138, held in position on the frame by a rod 139, threaded at one end at 139' to receive an adjusting-nut 140, a sleeve-nut 141 bearing against the inner side of the frame and serving to lock the block and its rod in position.

For adjusting block 138 a wedge-block 142, having a rod 143, threaded at its outer end, as at 143', is employed, nuts and washers 144 being utilized for the purpose of effecting the necessary movement of said rod and wedge-block. (See Fig. 10.) For the purpose of automatically opening the gripping-dies 125 126 after the toggles have been operated to withdraw the plunger 127 by the cam-and-lever mechanism above described spring-actuated plungers 145 145' are seated in chambers 146 146' of the die-block 119, each of said plungers having a conical end 146 146', respectively, which is forced between two adjacent inclined surfaces 125' 126' of the dies by a spring 147 147', respectively, the tension of said springs being controlled by hollow screws 148 148', threaded into the die-block and fitting over the stems of the plungers, as illustrated in Fig. 11.

Located in guideways 149 149' in the top of the frame, said guideways being covered by cap-plates 150 150', are slides 151 151', each carrying what is termed a "forming-die," (designated, respectively, by 152 and 152'.) These forming-die slides are alike, and to the end of each is connected a short section 153 153', respectively, each of said sections being joined to the slide by a tongue-and-grooved wedge 154 154', respectively, as illustrated in Figs. 2, 18, and 19, whereby the dies may be adjusted horizontally, if required, to enable the machine to operate upon stock of various diameters. These forming-dies, while of a particular configuration adapted to the manufacture of a special bolt or pin having a knob-shaped head, may be removed and others of different shape or form substituted, if desired, the invention not being limited to the production of any specific kind of head upon the stock. So, too, the heading-dies are removable and interchangeable, so that various forms of heads may be produced by simply substituting other dies for those shown. For actuating the forming-die slides cams 155 155' are secured to shaft 7, one of said cams being at the inner side of the bracket 8' and the other at the outer side of one of the brackets 8, as illustrated in Fig. 2. These cams are alike and are each composed of two members 156 156' and 157 157', respectively, preferably carried by an integral sleeve or hub 158 158', respectively, as illustrated in Figs. 2 and 16. These cams work in unison against rollers carried by pivoted levers 159 159', respectively, and to these levers are articulated pitmen 160 160', respectively, which are jointed to slides 161 161', working in grooves on the under portion of the frame, as illustrated in Fig. 19. These slides reciprocate longitudinally of the frame and are connected, respectively, to arms 162 162', loosely mounted adjacent to the lower ends of rock-shafts 163 163'. (See Fig. 18$^a$.) Keyed to each of these rock-shafts is an arm or crank 164 164', respectively, into which is threaded a hollow stud 165 165', respectively, and within each of said studs is a pawl or detent 166 166', respectively, which pawls are normally pressed into sockets or seats 167 167' of the arms 162 162' by springs 168 168', the tension of which may be regulated by screws 169 169', threaded into studs, as represented in Fig. 19. To each crank-arm 164 164' is secured by screws $164^2$ $164^3$, respectively, a plate $164^4$ $164^5$, respectively, which fits in a rabbeted portion of either arm 162 or 162' and serves to guide the crank-arm 164 or 164' should it sweep around the same. At their upper ends the rock-shafts 163 163' are each provided with arms 170 170', respectively, fitted with seats for the reception of the globular ends of toggle-links 171 171', respectively, as represented in Figs. 18, 19, and 32. From the construction just described it will be seen that as the cams 156 156' rotate they will impart reciprocatory movements to the slides 161 161', thereby simultaneously actuating the rock-shafts 163 163' and causing the toggle-links 171 171' to advance the forming-die slides 151 151' to close the forming-dies at the proper times upon the preliminary head upset on the end of the rod or wire by the heading dies or punches 30 and 31. It has been found in practice that the side-forming dies when advanced to embrace the partially-formed head at the position it occupies after the action of the preliminary heading-punches must of necessity be too thin to withstand the action of the head while under the influence of the punches and the blows of said punches upon them, and soon crystallize, crack, and break. The secondary feed places the end of the blank to be worked at such a distance from the face originally acting as a support or anvil to permit the use of dies sufficiently massive to withstand the usage to which they may be subjected and of a thickness impossible to be used without an increase of distance between the portion of blank to be engaged by the side dies and the face upon which they are supported. Should the head formed by said punches be distorted or should the movement of the forming-dies be blocked in any manner, the detents 166 166', which have beveled ends, will slip out of their seats in arms 162 162', and thus will prevent injury to the machine. In other words, these detents constitute safety devices which will yield and prevent the forming-dies from being operated should their action be clogged or blocked in any way. After the forming-dies have been closed around the partly-formed head of the rod the header-slide advances twice to cause the dies 32 33 to complete the formation of said head, and said forming-dies are then simultaneously withdrawn to enable the rod or wire with its completed head to be advanced by the main feed a sufficient distance to enable a blank of the desired length to be severed therefrom by cutting-off tools, which will now be described. These tools are carried by slides 172 172', respectively, and are simultaneously actuated by cam-grooves 173 174 in the sides of cams 118 and 57, as illustrated in Fig. 2. Fitted in the cam-groove 173 is a roll 175, carried by a lever 176, pivoted to the bed-plate, and to this lever is articulated a rod or pitman 177, which is in turn jointed to a slide 178, connected to an arm 179, secured to a shaft 180, carrying at its upper end an arm 181, constituting one member of a toggle. (See Figs. 17, 18, and 31.) This arm 181 is recessed at 181' to receive the globular end of a toggle-link 182, which is fitted at its opposite globular end in a recess 183' of slide 172, to which a cut-off die 184 is adjustably secured, said slide being slotted at 185 to receive a bolt 186, by which the block 187, carrying the cut-off die, is secured in position. By loosening the bolt 186, which is threaded into block 187, said block and the cut-off tool carried thereby may be adjusted transversely of the slide 172, whereby headed blanks of different lengths may be produced, if desired. Fig. 17 represents the cam-groove 173 in disk 118 for actuating through the connections described the right-hand cut-off-tool slide 172', and for simultaneously operating the left-hand cut-off-tool slide 172 the cam-groove 174 in disk 57 actuates mechanism the duplicate of that just described, the result being that both cut-off slides are simultaneously actuated at the proper time to sever a blank from the rod and are then simultaneously withdrawn. In Fig. 30 this duplicate mechanism is illustrated and the rock-shafts are marked with the powers of the numerals heretofore given. For instance, the rock-shaft at the other side is marked 180', and the other connections are indicated in the same manner. On the shaft 180 is loosely mounted the arm 189, and this arm is connected to a crank 190 by a yielding pin 191 in the same manner that the forming-die mechanism is connected to the devices for actuating the forming-dies, whereby should the advance of the cut-off tools be impeded in any manner the connections will yield and prevent breakage or derangement of the machine.

In Figs. 33 to 36, inclusive, the cut-off tool 184 is illustrated, and in front of the tool is shown a slide 214, having a lug 214', which travels between the shoulders of a groove 215 in block 187 to limit the movement of the slide. This slide may be integral with or bear against the head 210 of a push-pin or plunger 211, which passes through an opening in a lug 212 of the block 187, and at the front end of the lug and surrounding the pin is shown a spiral spring 213, which normally tends to push the slide 214 outward. By virtue of this construction the slide 214 serves to steady and support the end of the blank, clamping it against the cutting-off tool 184' as it is severed from the stock wire or rod 208 by the shearing action of the complemental cutting-off tools, the push-pin or plunger retreating within its seat in the tool-block, as illustrated in Fig. 36, to permit this result to be accomplished. Each cut-off tool, as illustrated, is grooved at its front end to receive the stem or stock end of the blank cut-off, and the end of slide 214 is also shown as grooved for the same purpose, mating with the cutting-off tool 184'.

In the peculiar operation of our machine the gagger-plate 19 serves an important function, as will be hereinafter described, and this plate is normally forced to the position represented in Fig. 13 by the spring 21, as before set forth.

Mounted on an arm 193 of the machine-frame 1 is a bracket 194, secured to said arm by bolts 195, and pivoted to this bracket is an angle-lever 196, having an inclined or cam-shaped end 196', which when the lever is rocked upward will bear against the roller 20 of the gagger-plate and will raise said plate to carry the horizontal arm 19' thereof out of line with the abutment or plate 17. To the lower arm 196² of lever 196 a pitman 197 is articulated, and this pitman is pivoted to an angular extension 198' of a lever 198, mounted for swinging movement upon a shaft 199 of the frame. For rocking lever 198 a cam 200, secured to shaft 7, is employed, and the periphery 200' of said cam bears against a roll 201 of the lever, thereby forcing it forward at the proper time and causing the cam-shaped end of lever 196 to raise the gagger-plate 19 and permit the block 12' to reciprocate without actuating the heading dies or punches at stated intervals. For returning the parts just described to their normal positions and for causing the roll 201 to bear against cam 200 a spring 202 may be employed, as illustrated in Fig. 13, or other means may be utilized for this purpose without departing from the invention.

In Fig. 15 we have illustrated a preferred form of toggle mechanism for actuating the feed-gripping jaws, and to the stirrup 203 lever 68 is articulated, as shown in said figure. Nuts and washers 204 204' 204² 204³ are employed for uniting these parts to bolt 67³; but as these details constitute no part of our invention it is unnecessary further to describe them.

Secured to the feed-slide 60 is a threaded rod 205, which passes loosely through an opening in the end of the feed-slide bracket 58, and on this rod are placed nuts 206 207, the former being within the bracket and the latter on the extreme outer end of said rod outside of the end wall 58' of bracket 58. These nuts serve, with the screw 107, to regulate and limit the movements of the feed-slide, so that the stock rod or wire 208 may be advanced the desired distance upon each stroke of said slide and the feed-gripping jaws carried thereby. The stop-faces afforded by such nuts prevent an overthrow of the slide. The springiness of the parts, particularly the arm or lever 92, and the backlash accentuated by wear will render some such stop mechanism important in a machine turning out accurate work.

For covering the end of the feed-slide a cap or plate 209 is bolted thereto, as illustrated in Figs. 7 and 9.

In the peculiar operation of our machine the stock rod or wire is first gripped by the jaws 63 63' and the feed-slide 60, carrying the levers 62 62', to which said jaws are secured, is then fed forward by the cam 112', operating through the lever 109, connecting-rod 108, rocker 105, connecting-rod 103, arm 100, and the other parts connecting said arm with the rock-shaft 93, as shown in Figs. 5 and 6, said rock-shaft being in turn connected to the feed-slide by the lever 92 and link 94, as illustrated in Fig. 7. This action of the feed-slide, constituting what is termed the "main feed," advances the stock wire or rod through the then open gripping-dies 125 126 of the machine. These dies are then closed upon the rod or wire by the slide 127, toggles 128 128', pitman 129, lever 130, and cam 131, thereby leaving the end of the stock rod or wire 208 projecting in front of the dies 125 126 in readiness to receive the blows of the heading-tools and the impact of the forming-dies. (See Fig. 10.) The header-slide 14 is then reciprocated by the eccentric 9, connected therewith by pitman 12 and block 12' and gagger-plate 19, thereby causing the first heading die or punch 30 to be forced against the end of the wire or rod and to upset or form the same to the shape shown at $a$ in the diagram, Fig. 21. After this action has taken place the header-slide is withdrawn and the slide 23, which travels with said header-slide and moves along the wide top of slide 46, is vertically reciprocated by the rack-and-pinion mechanism and its lever connections with the cam 56 (see Fig. 12) to bring the second heading die or punch 31 into line with the wire, and said header-slide is then advanced to cause said die 31 further to upset the wire and to bring the end thereof to the shape shown at $b$ in the diagram mentioned. The gripping-dies 125 126 are then opened by the mechanism heretofore described, (see Fig. 10,) and the rod or wire, with a partially-formed head having a shoulder thereon, is advanced through said dies by the secondary feed from the position shown in the diagram, where head $b$ is formed thereon, to the intermediate position represented at $b'$ in said diagram. When this has been accomplished, the forming-die slides 151 151' are simultaneously advanced to cause the forming-dies 152 152' to close around the partially-finished head of the blank, as shown at $c$ in Fig. 21. When these dies have closed upon said partially-formed head, the slide 23 has been raised by the mechanism described to bring the third heading die or punch 32 into line with the wire, and the header-slide 14 then advances and causes said punch or heading-tool further to upset the end of the wire into the shape shown at $d$, Fig. 21. After this action the forming-dies remain closed upon the wire for an interval, the header-slide is withdrawn, the slide 23 is again raised, and the fourth heading die or punch 33, carried by said slide, is advanced and upsets the head of the blank into the finished form, (shown at $e$, Fig. 21.) The forming-dies are then withdrawn, the header-slide is retracted, and the rod is fed forward by the main feed a blank length. During this action the cam 200 has forced upward the gagger-plate 19 against the action of the spring 21, said cam operating through the rocker 198 and its connections with the angle-lever 196. This gagger-plate will be held up during two strokes of the block 12' in the header-slide by the cam-surface 196' on the end of said angle-lever, during which of course the header-slide block 12' idly reciprocates without actuating the heading-tools carried by the slide 23. This affords time for the severing or cutting off of the completed blank from the rod by means of the cutting-off tools carried by the slides 172 and 172', said slides being simultaneously actuated to cause the tools 184 184' to sever the wire by the mechanism illustrated in Figs. 29, 30, and 31. After these actions the main clamping-jaws of the machine again close upon the rod, and the operation is repeated as long as the machine is working.

As will be seen by the line $f$ of the chart or diagram of Fig. 21, the block 39, having locking-notches 39' 39² 39³ 39⁴, is locked and unlocked four times during the formation of a head on the end of each rod. From the construction described it will be seen that if any of the cutting-off tools or forming-dies should be blocked in any manner, so that the die or tool could not close properly, the spring-actuated pin or detent will yield and disconnect the arms on the die or tool rock-shaft, thereby stopping further motion of the die or tool slide, and that when the cause of obstruction has been removed or overcome these spring-actuated detents will automatically enter their seats and again connect the parts for operation. Wire is usually supplied to the machine from a coil on a reel located at the front of straightening-rolls, (not shown,) and when the main feed has operated to advance the stock the desired extent and it has been clamped by the gripping-dies 125 126 the header-slide makes the first forward stroke and the cam-shaft 7 has turned about thirty degrees. At this time the slide 23 and attached heading-dies are down and the die 30 has upset the end of the stock to the shape shown at $a$, Fig. 21. Upon the next rotation of the eccentric-shaft 3, which is geared to the cam-shaft 7 by the pinion 5 and spur-wheel 6, the slide 23 is forced vertically upward one point, and when the cam-shaft has traveled through ninety degrees the second heading-die 31 has further upset the head to the shape $b$, Fig. 21. At this period the gripping-dies 125 126 are opened and the "secondary" feed acts to advance the partially-headed wire or rod, as shown at $b'$, Fig. 21, this feed being completed when the cam-shaft reaches the one-hundred-and-twenty-degree mark of rotation. The forming-dies 152 152' then advance upon the head and compress the same laterally, the cam-shaft having then turned one hundred and forty-five degrees of its rotation. At this time the header-slide is again advancing to cause the heading-die 32 to bring the head to the shape shown at $d$, which operation is completed when the cam-shaft has turned one hundred and fifty degrees. The feed-gripping jaws 63 63' are now opened, and the slide 60 is retracted to obtain a fresh supply of wire, and the gripping-dies 125 and 126 are closed, all of these operations taking place between the one-hundred-and-fifty-degree mark and the two-hundred-and-ten-degree mark in the rotation of the cam-shaft. The slide 23 is now raised for the fourth and last time in the formation of a complete head, and the header-slide again advances and causes the die 33 to upset the head to its finished form, as illustrated at $e$, Fig. 21, said head being completed when the cam-shaft has traveled two hundred and ten degrees. The cam-shaft continuing its rotation, the feed-slide 60 and its wire-gripping jaws are again advanced with a fresh supply of stock when the cam-shaft has reached the three-hundred-degree mark, and the cutting-off-tool slides 172 172' are then moved forward simultaneously to sever the headed blank from the stock as said shaft arrives at about the three-hundred-and-eight-degree mark. The finished blank then drops through an opening 310 in the frame leading to the exterior of the machine, and after these operations have been completed the cut-off tool and forming-die slides are returned to their open positions, the slide 23 being dropped to its lowest position when the cam-shaft has completed its three-hundred-and-sixty-degree rotation, leaving the wire or rod in position for a repetition of the operations described. All of these operations are graphically described in Fig. 21, the zigzag line $f$ disclosing the rising-and-falling movements of the slide 23 and header block or plate 25 and the words "Locked" and "Unlocked" on said line indicating how the locking-plate 39 is locked four times and unlocked four times during the formation of a head upon the stock. The lines $g$ and $h$ indicate the movements of the cut-off tools, the line $i$ the movement of the gagger-plate, line $k$ that of the header-block-shifting slide, line $l$ that of the main feed-slide, line $m$ that of the header-slide, line $n$ that of the feed-gripping jaws, line $o$ that of the secondary-feed cam, lines $p$ and $q$ the movements of the forming-die slides, and line $r$ the movement of the main gripping-jaws.

Many changes may be made in the constructional details of the various parts of our improved machine, and the invention is not limited to the precise devices illustrated and described.

Headed blanks of various shapes and kinds may also be formed by the machine by merely substituting dies of the proper character for those shown, and various devices may also be employed for actuating and locking the heading dies or tools without departure from the invention.

Having thus described our invention, what we claim is—

1. The combination, with the die-holder and gripping-dies of a heading-machine, of knob-forming dies mounted on the front of said gripping-dies; a header-slide carrying a plurality of heading dies or punches; means for successively operating the heading dies or punches; means for opening said knob-forming dies for the action of one of said punches and closing them for a subsequent action of said header slide and punches, and means to advance the knob prior to said closing.

2. The combination, with the die-holder and gripping-dies of a heading-machine, of knob-forming dies and holders mounted to slide on the front of said gripping-dies; a header-slide carrying a plurality of punches for acting on the stock held in said gripping-dies; means for successively operating the punches; means for feeding the blank after the action of a punch of said header-slide, and means for closing said knob-forming dies after such feed.

3. The combination, with a header-slide having a guideway in its forward end, of a slide mounted in said guideway; a block having a series of locking-notches secured to said slide; a horizontally-shiftable slide carrying a pawl for engaging consecutively with said locking-notches; cams for shifting said slide; and a series of heading dies or punches carried by the slide.

4. The combination, with a header-slide having a guideway, of a slide mounted for movement in said guideway; means for actuating said slide; a block having a series of locking-notches secured to the rear side of said slide; a shiftable plate having a pawl for consecutively engaging said locking-notches; stationary devices carried by the frame for actuating said plate upon the reciprocation of the header-slide; and a series of heading dies or punches mounted on the slide carrying the locking-block.

5. The combination, with a header-slide having a guideway in its front end, of a slide mounted in said guideway; a block having a series of locking-notches secured to the rear portion of said slide; means adapted to engage with each of said locking-notches; a plate having a wedge-shaped surface secured to the front of the slide; a series of heading dies or punches carried by said plate; and a wedge also carried by the plate for adjusting said dies or punches.

6. In a machine of the class specified, the combination, with a header-slide, and with means for actuating said slide, of a vertically-movable slide mounted in a guideway in said header-slide; means for actuating said vertically-movable slide; a block having a series of locking-notches carried by the vertically-movable slide; a slide movable transversely of the header-slide and carrying a device for consecutively engaging with said locking-notches; a series of heading dies or punches carried by the vertically-movable slide; and means for adjusting said heading dies or punches.

7. In a machine of the class specified, the combination, with a header-slide having a guideway, of a vertically-movable slide working in the said guideway; a block having a series of locking-notches carried by the vertically-movable slide; a plate carrying a pawl or tooth, and fitted for movement transversely of the header-slide; means for actuating said plate; a series of heading dies or punches carried by the vertically-movable slide; and means for reciprocating the header-slide.

8. The combination, with a header-slide, having a guideway, of a slide reciprocating in said guideway, and carrying a roller at its lower end; a rack for actuating the reciprocatory slide; a shaft carrying gears, one of which engages the rack; a rack engaging the other gear on said shaft; a pitman for actuating the last-named rack; and cam-controlled mechanism for actuating the pitman.

9. In a machine of the class specified, the combination, with a header-slide having a vertical guideway, and with means for reciprocating said slide, of a slide vertically movable in said guideway; a plate carrying a rack for actuating the vertically-movable slide; gearing for actuating the rack; a cam and connections for actuating said gearing; and a series of heading dies or punches carried by the vertically-movable slide.

10. The combination, with a die-holder, of gripping-dies mounted therein; mechanism for opening and closing said dies; forming side dies mounted in front of said gripping-dies and having a thickness greater than the height of the portion of the blank to be subjected to the influence thereof; mechanism for opening and closing said forming side dies; a header-slide carrying a plurality of punches; means for successively actuating the punches; main and secondary feed mechanisms coöperating with said dies and heading-punches; and means to actuate the secondary feed mechanism prior to the closing of the side dies.

11. In a machine of the class specified, the combination, with gripping-dies, of means for actuating said gripping-dies; heading mechanism; a feed-slide; stock-clamping jaws carried by said feed-slide; means for opening and closing said stock-clamping jaws; a rock-shaft; means connecting said rock-shaft with the feed-slide; a second rock-shaft; and mechanism connecting the second rock-shaft with the means for actuating the stock-clamping jaws.

12. In a machine of the class specified, the combination, with gripping-dies, of mechanism for actuating said gripping-dies; a feed-slide; levers pivoted to said feed-slide; feed-clamping jaws carried by said levers; toggle mechanism for opening and closing the pivoted levers; a lever pivoted to a part of the toggle mechanism; a yielding connection between said lever and the frame; means for actuating said lever to cause it, through the toggle mechanism, to open and close the feed-clamping jaws; and means for reciprocating the feed-slide.

13. The combination, with gripping-dies, of means for opening and closing said dies; a feed-slide; means for reciprocating said feed-slide; movable feed-clamping jaws; a lever for operating said clamping-jaws; means for actuating the lever; and a link pivoted to the lever and to the frame.

14. The combination, with gripping-dies, and with means for opening and closing said dies, of a feed-slide; a pair of levers pivoted to said feed-slide; toggle mechanism for actuating said pivoted levers; a lever articulated to a member of said toggle mechanism; a link connecting said lever to the frame; a rock-shaft; means for actuating said rock-shaft; a crank-arm secured to the rock-shaft; and a link connecting said crank-arm with the lever for actuating the toggle mechanism.

15. The combination, with dies for gripping the stock, of heading mechanism; a feed-slide; a rock-shaft and connections for reciprocating said feed-slide; feed-gripping mechanisms on the feed-slide; means for actuating said feed-gripping mechanism; a cam on the driving-shaft; and means connecting said cam with the mechanism for actuating the feed-gripping mechanisms and comprising a rock-shaft, an arm thereon, an idler rock-arm connected thereto, a pitman controlled by said cam, a pin on the idler-arm, a hook on the pitman adapted to engage the pin, a rock-arm, manually-controlled means to rock the same, and a cam-face on said arm adapted to disengage said hook from the pin, whereby the feed-gripping mechanism may be rendered inoperative without stopping the machine.

16. In a machine of the class specified, the combination, with feed mechanism, of gripping-dies; means to actuate said dies; a header-slide; means to reciprocate said header-slide; a series of heading dies or punches carried thereby to consecutively upset the end of the work; means to move said heading-dies transversely of the header-slide; forming-dies to engage the sides and back of the head during its formation; means to impart a secondary feed to the work after a portion of the heading-dies have acted to bring its end into position to receive the action of the forming-dies; and means to actuate said dies.

17. In a machine of the class specified, the combination with a chambered header-slide, of a series of heading dies or punches mounted on said header-slide; a block reciprocatory in ways of the header-slide in said chamber adapted to engage and break engagement with the header-slide; a gagger-plate reciprocatory in ways of the block transverse to the former ways; and automatic means for reciprocating the gagger-plate and embodying a roller on the gagger-plate, a shiftable inclined face therefor, and means to shift the inclined face.

18. The combination, with gripping-dies, of means for opening and closing said dies; rod-feeding mechanism; means for actuating said mechanism to impart a main feed movement to the rod; multiple heading mechanism, one of the dies of which is adapted to partially form the head on the end of the rod, and another of which is adapted to complete said head; forming-dies adapted to engage the sides and back of the head during the completion thereof; means for imparting a supplemental movement to the rod-feeding mechanism, after the partial formation of a head whereby to feed the rod forward to bring its partially-headed end into line with the forming-dies; and mechanism for actuating said forming-dies to cause them to close upon the incomplete head.

19. The combination, with gripping-dies, and with means for actuating said dies, of a header-slide; a series of heading dies or punches carried by said slide embodying preliminary and finishing heading dies or punches; means for intermittingly actuating said dies or punches in sequence across the face of the slide; movable forming-dies for closing upon the preliminarily-headed end of the rod; means for actuating said forming-dies; a feed-slide; means carried by said slide for clamping a rod; and means for imparting main and supplemental feed movements to said feed-slide respectively before and after the action of the preliminary dies or punches.

20. The combination, with a feed-slide carrying a clamp, of a lever connected to said slide; a rock-shaft carrying said lever; a pitman; means connecting one end of said pitman with the rock-shaft; a rocker to which the other end of said pitman is attached; a second pitman articulated at one end to the rocker; a pivoted lever to which the opposite end of the second pitman is attached; and a cam for actuating said pivoted lever.

21. The combination, with a feed-slide, of means for actuating said slide; levers pivoted to said slide and carrying clamping-jaws; a toggle for actuating said levers; a lever for operating the toggle; a link connecting said lever to the frame; a rock-shaft connected to the lever; and means for actuating the rock-shaft.

22. The combination, with a feed-slide, of means for reciprocating said slide; levers pivoted to the end of said slide, and each carrying a clamping-jaw; a toggle for actuating said levers; a lever for actuating the toggle; a rock-shaft connected to said lever; an arm carried by the rock-shaft; a cam; and means connecting said cam with the arm of the rock-shaft.

23. The combination, with a feed-slide, and with means for reciprocating said slide, of rod-clamping mechanism carried by the slide; a device for actuating said rod-clamping mechanism; a rock-shaft for actuating said device; an arm carried by the rock-shaft; a pitman connected to said arm at one end; a rocker to which the opposite end of said pitman is connected; a connecting-rod detachably connected to the rocker; means for releasing said connecting-rod from the rocker; and cam-and-lever mechanism for actuating said connecting-rod.

24. The combination, with a feed-slide, of means for reciprocating said slide; levers pivoted to the inner end of said slide and each carrying a rod-clamping jaw; toggle mechanism for operating said levers; a lever for operating said toggle mechanism; a rock-shaft having an arm; a link connecting said arm with the toggle-actuating lever; a slotted arm also secured to the rock-shaft; a pitman one end of which is adjustably mounted in the slot of said arm; a rocker to which said pitman is connected at its other end; a connecting-rod detachably secured to the rocker; cam-and-lever mechanism for actuating said connecting-rod; and means for lifting the connecting-rod from its seat upon the rocker when it is desired to stop the feed.

25. In a bolt-machine, the combination, with a feed-slide reciprocable in ways of the frame, of a rock-shaft connected to said feed-slide; means for actuating the rock-shaft; clamping-jaws carried by the feed-slide; mechanism for actuating said clamping-jaws; a rock-shaft connected to said mechanism; an arm carried upon one end of said rock-shaft; a pitman adjustably mounted upon said arm; a rocker to which said pitman is articulated; a connecting-rod hooked upon the rocker; a lever having a cam-surface for raising said connecting-rod; means for actuating said lever; and means for actuating the connecting-rod.

26. In a bolt-machine, the combination, with a feed-slide, and with means for actuating said slide, of rod-clamping devices carried by said slide; a rock-shaft connected with the rod-clamping devices; a pitman connected to the rock-shaft; a rocker having a projection; a connecting-rod having its inner end hooked over said projection; means for actuating said connecting-rod; a swinging cam for lifting the hooked end of the connecting-rod from the projection; a hand-lever; and means connecting said hand-lever with the swinging cam.

27. In a bolt-machine, the combination, with a feed-slide, of means for imparting to said slide main and supplemental feed movements; a pair of levers, each carrying a rod-gripping jaw, pivoted to the feed-slide; a toggle for opening and closing said levers; a lever connected at one end to the toggle; means for actuating said lever; and a link connecting the other end of the lever to the frame.

28. In a bolt-machine, the combination, with a header-slide, and with means for reciprocating said slide, of a carrier; a series of heading dies or punches secured to said carrier; a slide for reciprocating the carrier; a rack attached to the slide; a shaft carrying pinions, one of which is in engagement with said rack; and intermittingly-operated gearing for actuating the other pinion.

29. In a bolt-machine, the combination, with a header-slide and with means for intermittingly reciprocating said slide, of a carrier; a series of heading dies or punches secured to said carrier; a slide for reciprocating the carrier; a rack attached to the slide; a shaft carrying pinions, one of which is in engagement with said rack; and an intermittingly-operated rack for actuating the other pinion.

30. In a bolt-machine, the combination, with a header-slide, and with means for intermittingly reciprocating said slide, of a carrier movable across the face of the header-slide; a series of heading dies or punches secured to said carrier; a slide for reciprocating the carrier; a rack attached to the slide; a pinion in engagement with said rack; and intermittingly-operated gearing for actuating said pinion.

31. In a bolt-machine, the combination, with a header-slide having a guideway in its end, of means for intermittingly actuating said header-slide; a vertical slide fitted in said guideway; a series of heading dies or punches carried by said vertical slide; a slide having a guide upon which the end of the vertical slide moves as the header-slide reciprocates; a rack secured to the guide-slide; gearing for actuating said rack; and means for intermittingly actuating the gearing.

32. In a bolt-machine, the combination, with a header-slide having a guideway, of a vertical slide fitted in said guideway; a notched locking-block secured to said vertical slide; a series of heading dies or punches carried by the vertical slide; a slide carrying a pawl adapted to engage with the notches of the locking-block; a rack-slide in engagement with the header-slide and having a guide to permit the movement of said vertical slide back and forth thereon; a rack secured to said rack-slide; gearing for actuating the rack; and means for intermittingly actuating said gearing.

33. In a bolt-machine, the combination, with a chambered header-slide, of a gagger-plate; a block in a way of which the gagger-plate is mounted; lever mechanism moving the gagger-plate in one direction; means to intermittently actuate the same; a spring to return said gagger-plate; an abutment on the header-slide; a slide fitted for movement in a guideway of the header-slide; a series of heading dies or punches carried thereby; means to lock the slide in position when actuated; and means to intermittingly reciprocate said slide.

34. In a bolt-machine, the combination, with a header-slide having a guideway in its end, of a vertical slide fitted in said guideway and carrying an antifriction-roller at its lower end; a locking-block having a series of notches secured to said vertical slide; a series of heading dies or punches also secured to said vertical slide; means for engaging and disengaging the notches of the locking-block; a rack-slide having a guide upon which rests the antifriction-roller of said vertical slide; a rack secured to the rack-slide; a shaft carrying a pinion in engagement with said rack; a second pinion carried by said shaft; a rack in engagement with the second pinion; a pitman connected to said rack; a lever to which said pitman is articulated, said lever having a stud; and a cam having a series of active portions for intermittingly actuating the lever.

35. The combination, with multiple heading mechanism, of means to successively bring the elements thereof into action; feed mechanism; means to impart a main feed movement to said feed mechanism; means to impart a supplemental feed movement to the feed mechanism after the actuation of a part of the heading mechanism; gripping-dies; means to actuate said dies to open and close respectively before and after the several feed movements; slides carrying forming-dies; rock-shafts; toggle connections between said rock-shafts and said forming-die slides; and mechanism for simultaneously actuating the rock-shafts to close the forming-dies after the supplemental feed movement.

36. In a bolt-machine, the combination, with a pair of cut-off slides, of cut-off tools carried by said slides; rock-shafts having arms at their upper ends, each arm provided with a socket; links seated in said sockets and in the slides; crank-arms rigidly secured to the lower ends of the rock-shafts; arms loosely mounted on said rock-shafts adjacent to the crank-arms thereof; a spring-pressed pin and a socket therefor, one of which is beveled to connect each crank-arm and coöperative loosely-mounted arm; slides connected to the loosely-mounted arms; and means for reciprocating said slides.

37. In a bolt-machine the combination with a feed-slide, of a rock-shaft connected to said feed-slide; a crank-arm fast on said rock-shaft and having a slot; a wrist-pin adjustable in the slot of the crank-arm; an arm loose on the rock-shaft and having an eye; an arm intermediate of the said arms and having a groove to receive said wrist-pin and carrying at one end a stud fitted loose in said eye and at the other end an actuator connection; actuator means connected to said connection to turn said intermediate arm on said stud as a fulcrum and to hold said connection-carrying end to afford a pivot or fulcrum for said arm at such end; and means for turning the loose arm on the shaft as a fulcrum and to hold it from turning thereon, the turning of the loose arm upon the shaft being effective to turn the intermediate arm upon the fulcrum afforded by its actuator whereby one end of the intermediate arm is held as a fulcrum during the movement of the opposite end to give the rock-shaft an excursion of oscillation embodying two steps.

38. In a bolt-machine, the combination, with a feed-slide, of a rock-shaft connected to said feed-slide; a slotted crank-arm rigidly secured to said rock-shaft; a wrist-pin adjustably secured in the slot of said crank-arm; an arm having a recess to receive the wrist-pin and carrying at one end a stud and at the other end a circumferential groove; a pitman having an eye fitted in said circumferential groove and means for actuating said pitman to turn said arm on its stud as a fulcrum and to hold it from so turning and to then act as a fulcrum therefor; an arm loosely mounted at one end on the rock-shaft and at its opposite end on said stud, and a pitman connected to said latter arm and means for actuating said pitman to turn said arm on its shaft as a fulcrum, and to hold said arm from so turning and thereby hold the said stud as a fulcrum for the arm carrying the same.

39. The combination with a shaft having an eccentric, of a pitman connected to the eccentric; a block connected to the pitman; a header-slide in which the block reciprocates; a movable gagger-plate carried by the block; automatic means for actuating the gagger-plate; a slide fitted in a groove on the header-slide; a block having locking-notches carried by the slide; a transversely-reciprocatory plate having a pawl or detent for engaging with the locking-notches of the block; automatic means for reciprocating the plate as the header-slide moves back and forth; and a series of heading dies or punches carried by the slide.

40. In a machine of the class specified, the combination with a header-slide having a guideway, of a slide reciprocatory in the guideway; a block carrying locking devices secured to the reciprocatory slide; means reciprocable transversely of the path of movement of the header-slide for engaging the locking devices of the block; and means for reciprocating the locking-device-engaging means.

41. The combination with a header-slide having a guideway and with means for actuating the slide, of a movable slide fitted to the guideway; a block having inclined notches secured to the rear portion of the movable slide; a plate having an inclined pawl or tooth reciprocable transversely of the path of movement of the header-slide to lock and unlock the block; means for reciprocating the plate; and a series of heading dies or punches carried by the movable slide.

42. The combination with a die-block having a guideway, of a pair of gripping-dies provided with beveled corners; means for closing the dies; a pair of plunger-chambers in the die-block adjacent to the normal position of the meeting beveled corners of the gripping-dies; plungers mounted in the plunger-chambers and provided with beveled ends; springs for advancing the plungers into the corners between the gripping-dies; and an adjustable abutment within the plunger-chambers for regulating the tension of the plunger-springs.

43. The combination with a die-block having a guideway, of gripping-dies; one or more grooves in each die for the reception of the work; beveled edges at the meeting of the dies; means for closing the gripping-dies; plunger-chambers in the die-block in line with the crevices comprising the bevel of the abutting gripping-dies; a plunger mounted in each chamber and provided with an end adapted to enter the crevice; springs for advancing the plungers; screw-threads upon the inner walls of the chambers; and screw-threaded bushings mating with such screw-threads and forming guides for the plunger-stems and abutments for the plunger-springs.

44. The combination with die-slides movable toward and from each other in ways of the machine-frame, of means for moving each slide comprising a rock-shaft and connections therefrom; a crank-arm secured to the rock-shaft; a slide to actuate the crank-arm; a pitman connected to the slide; a pivoted lever to which the pitman is connected; and means to positively rock the lever in both directions.

45. The combination with a feed mechanism, of a shaft effective when rocked to actuate the feed; an arm fast upon the shaft; an adjustable lug upon the arm; an arm loosely mounted at one end upon the shaft; an opening in the swinging end of the arm; an arm medially disposed relatively thereto having a lug fitting the opening in the loose arm and a hub with an opening of larger diameter than the shaft surrounding the shaft and an opening receiving said lug; a cam-shaft; a pair of cams upon the cam-shaft; a pitman connected to the swinging end of the loose arm and actuated by one of the cams; and a pitman having an eye embracing the shaft-surrounding hub of the medially-disposed arm.

46. The combination with a feed mechanism, of a shaft effective when rocked to actuate the feed; an arm fast upon the shaft; an adjustable lug upon the arm; an arm loosely mounted at one end upon the shaft having an opening in the swinging end thereof; an arm medially disposed relatively thereto having a lug fitting the opening in the loose arm, an opening receiving said adjustable lug and a hub with an opening of larger diameter than the shaft surrounding the shaft; a cam-shaft; a pair of cams upon the cam-shaft; a pitman connected to the swinging end of the loose arm and actuated by one of the cams; a pitman having an eye embracing the shaft-surrounding hub of the medially-disposed arm; and means for adjusting the length of stroke of one of the pitmen.

47. The combination with feed mechanism, of a shaft to actuate the same; two arms fulcrumed at the axis of the shaft, one of which arms is fast thereon and one of which is loose; an arm therebetween and fulcrumed to the end of the loose arm and pivotally connected to the fast arm; and means for turning the loose arm and the medially-disposed arm upon their respective fulcrums at different intervals and for holding each arm from turning on its fulcrum during the turning of the other arm upon its fulcrum.

48. In a bolt-heading machine, the combination with a header-slide having an abutment, of ways upon which the slide is shiftable; a header die or punch carried thereby; means to reciprocate the header-slide and embodying a slide shiftable in ways on the header-slide; a gagger-plate carried by said slide and having a transverse arm adapted to bear against the abutment and to make and break the active connection between the header-slide and the slide shiftable thereon; and automatic means to actuate the gagger-plate.

49. The combination with a slide shiftable on ways and carrying ways parallel thereto, of an eccentric and pitman; a block pivoted to the pitman and reciprocatory on ways carried by the slide; an abutment on the slide; a slide transversely reciprocatory on the block; an arm on said slide adapted to engage the abutment and actuate the slide upon the movement of the block; and means to shift the transverse slide to withdraw the arm from engagement with the abutment and permit the block to reciprocate idly in the header-slide.

50. In a machine of the class specified, the combination with main and secondary feeding mechanisms, of gripping-dies; a series of heading dies or punches; means to actuate the same to act successively upon stock held by the gripping-dies before and after the secondary feed; means to actuate the gripping-dies and cause the same to open during the feed movement; forming-dies to engage the stock after action of some of the dies or punches upon it; and means to actuate the forming-dies after the secondary feed preliminary to the last operation of the heading-dies.

51. In a machine of the class specified, the combination with a header-slide and means to reciprocate the same, of a slide transversely shiftable at the front of said header-slide; a series of heading dies or punches carried thereby; mechanism to actuate said transversely-movable slide to bring the dies in sequence into active position; gripping-dies; means to open and close the same; side forming-dies; means to open and close the same; main feeding mechanism organized to feed the rod while the gripping-dies are open and into position to be acted upon by some of the heading-dies; and a secondary feed mechanism to feed the partially-formed head into position to be engaged by the forming-dies while the same are open and while the gripping-dies are open.

52. The combination with a header-slide having a recess and an abutment, of a block mounted to reciprocate within said header-slide and provided with a groove; means to reciprocate the block; a gagger-plate having a head fitted in the said groove and also having a horizontal arm adapted to bear against said abutment; and cam mechanism for raising the gagger-plate and means for returning the same to its normal position.

53. The combination with a header-slide having an abutment and a recess, of a gagger-plate movable in said recess and having an arm adapted to bear against the abutment or to reciprocate idly past the same; a block having a groove in which the head of the gagger-plate is fitted; an antifriction-roll upon said head; an angle-lever constituting a track for said roll; means to rock the same to force the gagger-plate in one direction to permit the arm to reciprocate idly; and means to return the plate to its normal position to permit the arm to engage the abutment.

54. The combination with a header-slide having a guideway in its forward end, of a slide mounted in said guideway; a series of heading dies or punches secured to said slide; an antifriction-bearing on said slide; a track for the said bearing; a slide carrying the track; a rack on the said slide; a shaft; a pair of pinions fast thereon and one of which is in mesh with said rack; a slide; a rack carried thereby and in engagement with the other pinion; and means to reciprocate said latter slide.

55. The combination with a die-holder, of gripping-dies mounted in said die-holder; means to actuate said dies to open and close the same twice during a complete operation; forming-dies mounted in advance of said gripping-dies; means to open and close said forming-dies; a preliminary heading die or punch; means to actuate the same; main feed mechanism to advance stock through the gripping-dies, while open, to a point where the end thereof will be acted upon by the preliminary heading die or punch; a finishing heading die or punch; a secondary feed mechanism to advance the stock through the gripping-dies while open and the forming-dies while open to a point where it will be engaged by the forming-dies and acted upon by the finishing heading die or punch; and means to actuate the finishing-punch.

56. In a bolt-heading machine, the combination with a die-holder, of gripping-dies mounted in said die-holder; means to actuate said dies to open and close the same twice during a heading operation; a preliminary heading-die; means to actuate the same; main feed mechanism to advance stock through the gripping-dies while open to a point where the end thereof may be acted upon by the preliminary heading-die; forming-dies mounted in advance of the gripping-dies; means to open and close said forming-dies; a finishing heading-die; secondary feed mechanism to advance the stock through the gripping-dies while open and forming-dies while open to a point where it may be acted upon by the forming-dies and the finishing-die; means to actuate the finishing-die; cut-off mechanism to sever the product after the main feed to present fresh stock to the dies; and devices to actuate said cut-off mechanism.

57. In a machine of the class specified, the combination with gripping-dies, of mechanism to open said dies prior to the main and secondary feeds and to close the same thereafter; a series of heading dies or punches; means to actuate said heading dies or punches in sequence; main feed mechanism to advance a rod or wire through the gripping-dies when open to a position where it will be upset by certain of the heading dies or punches; secondary feed mechanism to feed the rod or wire while the gripping-dies are open to cause the partially-formed head thereon to project slightly in front of the gripping-dies; forming-dies adapted to be shifted in front of the gripping-dies and having working faces adapted to compress the incomplete head of the rod laterally; and mechanism to actuate said forming-dies.

58. In a machine of the class described, the combination, with dies for gripping the stock, of heading mechanism comprising a series of punches; forming-dies; main and secondary feed mechanisms; means for independently actuating said main and secondary feed mechanisms, respectively, to first advance the stock until its end projects from the gripping-dies, and subsequently, after the actuation of some of the punches, to again advance said stock to bring its end in line with the forming-dies; cams on the driving-shaft to actuate said means; devices connecting said cams with the feed mechanisms; and means to close the forming-dies on the advanced stock prior to the actuation of the remainder of said punches.

59. The combination with gripping devices, and with means for opening and closing said devices, of feeding means; means for actuating the same to cause the end of the work to project on one side of the gripping-dies; means for acting upon the end of the work; means to again actuate the feeding means to cause the end of the work acted upon to project farther on the side of the gripping-dies; forming-dies for engaging the end of the work so projected; and means for acting upon the end of the work a second time.

60. The combination with gripping-dies, of means to open and close said dies; a feed-slide carrying a clamp to secure the stock rod thereto; means to actuate said feed-slide to impart a feed movement to said rod; multiple heading mechanism one of the dies of which is adapted to partially form a head on the end of the rod and another to complete said head; forming-dies to engage the sides of the head; means to impart a supplemental movement of the feed-slide to cause said slide to advance the rod to a position where the partially-completed head will be in line with the forming-dies; and mechanism to actuate said dies to cause them to close upon the incomplete head.

61. The combination with feed-gripping dies, of preliminary heading-tools and heading-tools; means to actuate the same in sequence; means to open and close the dies; means to advance the same when closed prior to the first actuation of the preliminary heading-tools; means to advance the same while still closed before the actuation of the heading-tools; forming-dies; means to close the same upon the partially-headed stock when advanced the second time; and means to hold the stock while it is being headed.

62. The combination with heading mechanism comprising preliminary and complete heading-tools, of a die-block; gripping-dies through which the stock may be fed; means to open and close said dies; main feeding mechanism to shift said dies and advance the stock so that its end from which the head is to be formed will project beyond the die-block; forming-dies; supplemental feed mechanism to further shift said dies and advance the partially-completed head from the die-block and between the forming-dies; means to actuate the same between the actuation of the preliminary and the completing heading-tools; and means to hold the stock while it is being headed.

63. The combination with a die-block, of gripping-dies mounted therein and adapted to hold a blank; means to reciprocate one of said dies toward and from the other to clamp and release the blank twice during each revolution of the cam-shaft; a feed-slide; a blank-clamping device carried by said feed-slide; a series of heading-dies; means to actuate the same in sequence; a system of linkage to shift the feed-slide to advance the rod during one of its periods of release by the gripping-dies and before the actuation of the heading-die: and a supplemental system of linkage to act upon said system to further shift said slide and rod during a subsequent period of release.

64. In a bolt-machine, the combination with a feed-slide, of a rock-shaft; an arm secured to the rock-shaft and connected to the feed-slide; a crank-arm rigidly secured to the rock-shaft; an arm loose on said rock-shaft; an intermediate arm between said loose arm and said crank and pivotally connected at its end to the said loose arm and pivotally connected to the crank at a point at a less distance radially from the rock-shaft than the point of its connection to the loose arm; and separate means to actuate and control said loose arm and said intermediate arm one of which said means being connected to the intermediate arm at a point on the opposite side of its point of connection to the crank.

65. In a bolt-machine, the combination with a feed-slide, of a shaft connected to said feed-slide; an arm loosely mounted on the outer end of said shaft; means to actuate said arm; a crank-arm rigidly secured to said outer end of the shaft; means attached to the loosely-mounted arm and the crank-arm at different distances from the shaft to connect the same; and independent means to shift said loose arm and said attaching means to impart two distinct feeds to said slide.

66. In a bolt-heading device the combination with means to grip the stock, of means to actuate the gripping means; a feed-slide having means to grip the stock; means to actuate the feed-slide comprising a shaft; a crank-arm fast thereon; a pair of lever-arms one of such arms having its fulcrum axially coincident with the shaft and one of which arms having its fulcrum in the free end of the other; a cam to move the former lever-arm upon its fulcrum and to hold it in its moved position; and a cam to move the latter lever-arm upon its fulcrum and to hold it in position; and means to connect the latter arm to the crank-arm.

67. The combination with means to hold the stock; of a rock-shaft connected to the holding means to advance the same; a crank secured to the rock-shaft; a cam-shaft; a pair of cams upon the cam-shaft; an arm connected to the crank and actuated by one of the cams and controlled by the other to rock the shaft; and an arm mounted loose upon the said rock-shaft and pivotally connected to the other arm and thereby to the rock-shaft and actuated by the second-mentioned cam and controlled by the first-mentioned cam to rock the shaft an additional distance in the same direction, all organized so that the device will be advanced in its working direction, positively held from recession therefrom, and again advanced in the same direction while so held, both cams coöperating in effecting each advance.

68. The combination with a feed-slide, of a rock-shaft; an arm secured to said rock-shaft and connected with the feed-slide; a crank-arm secured to the rock-shaft; a lever connected midward of its ends to such crank-arm; means to alternately make the respective ends thereof a fulcrum; and means to turn the lever upon its respective fulcrums.

69. The combination with blank-holding means, of means for forming, by successive steps, a head upon a rod; means for advancing the blank along its axial line between such steps; and means for engaging and supporting the back and a portion of the sides of the partially-formed head during the forming steps succeeding such advance.

70. In a machine of the class described, the combination, with dies for gripping the stock, of heading mechanism comprising punches adapted to act at different points in the same line; forming-dies; main and secondary feed mechanisms; means for independently actuating said main and secondary feed mechanisms, respectively, to first advance the stock along said line of activity of the punches until its end projects from the gripping-dies, and subsequently, after the actuation of one of said punches, to again advance said stock upon the same line to bring its end in line with the forming-dies; and means to close the forming-dies on the advanced stock prior to the actuation of another of the said punches.

71. The combination with blank-feeding mechanism, of gripping-dies; means for forming by successive steps a head upon the blank; forming-dies; and means for advancing the blank in the gripping-dies between the steps and placing the head under formation into position for engagement and support by the forming-dies during the succeeding steps.

72. In a bolt-machine, the combination with a bracket secured to the frame, said bracket having guideways, of a feed-slide mounted thereon; a pair of pivoted levers mounted upon the feed-slide, each lever carrying a rod-clamping jaw; a rock-shaft and intermediate mechanism for opening and closing said pivoted levers; and means involving a detachable connection for actuating the rock-shaft.

73. In a bolt-machine, the combination with a bracket secured to the frame, said bracket having guideways, of a feed-slide mounted thereon; a threaded stop-rod secured to said feed-slide and passing through an opening of the bracket; screw-threaded stops upon said rod for limiting the movement of the feed-slide in either direction and for preventing overthrow; and means to actuate said slide.

74. In a bolt-machine the combination with gripping-dies, preliminary heading-punches, finishing heading-punches and forming-dies, of means to actuate the respective heading-punches in sequence; means to actuate the forming-dies; means to project a blank after the actuation of the preliminary heading-punches and while in control of the gripping-dies to such a position that its head will be embraced by the forming-dies prior to the actuation of the finishing heading-punches.

ETHELBERT ALLEN MOORE.
FRANKLIN HOLLAND.

Witnesses for Ethelbert A. Moore:
 WM. H. BLODGETT,
 E. W. CHRIST.

Witnesses for Franklin Holland:
 WM. H. BLODGETT,
 THOS. J. CARR.